(12) United States Patent
Kadowaki et al.

(10) Patent No.: US 7,842,203 B2
(45) Date of Patent: Nov. 30, 2010

(54) GASKET FOR MOLDING PLASTIC LENS

(75) Inventors: Shinichiro Kadowaki, Tokyo (JP); Toshihisa Kawakami, Tokyo (JP)

(73) Assignee: Hoya Corporation, Tokyo (JP)

( * ) Notice: Subject to any disclaimer, the term of this patent is extended or adjusted under 35 U.S.C. 154(b) by 1123 days.

(21) Appl. No.: 10/577,699

(22) PCT Filed: Oct. 29, 2004

(86) PCT No.: PCT/JP2004/016164

§ 371 (c)(1),
(2), (4) Date: Apr. 28, 2006

(87) PCT Pub. No.: WO2005/042221

PCT Pub. Date: May 12, 2005

(65) Prior Publication Data

US 2007/0071844 A1    Mar. 29, 2007

(30) Foreign Application Priority Data

Oct. 31, 2003  (JP) .............................. 2003-372967
Nov. 28, 2003  (JP) .............................. 2003-399961

(51) Int. Cl.
  *B29D 11/00*  (2006.01)
(52) U.S. Cl. ......................................... 264/2.2; 264/2.3
(58) Field of Classification Search ................. 264/2.2, 264/2.3
See application file for complete search history.

(56) References Cited

U.S. PATENT DOCUMENTS 4,251,474 A    2/1981  Blandin 4,693,446 A *  9/1987  Orlosky ................... 249/53 R

FOREIGN PATENT DOCUMENTS

| JP | 55-121028 A | 9/1980 |
|---|---|---|
| JP | 58-224724 | 12/1983 |
| JP | 01-258916 | 10/1989 |
| JP | 02-139207 A | 5/1990 |

(Continued)

OTHER PUBLICATIONS

"Spectacles", May 22, 1986, pp. 83-85, Kabushiki Kaisya Medical Aoi Shuppan.

*Primary Examiner*—Christina Johnson
*Assistant Examiner*—Galen Hauth
(74) *Attorney, Agent, or Firm*—Blakely, Sokoloff, Taylor & Zafman

(57) ABSTRACT

A mold (1) for molding a plastic lens is formed of a first mold (3) which forms one lens surface of the plastic lens, a second mold (4) which forms the other lens surface of the plastic lens, and a cylindrical gasket (2) into which the first and second molds (3, 4) are to be pressed. An elastically deformable projecting band (5) which has a triangular section and tapers gradually toward its distal end integrally projects on the inner circumferential surface of the gasket (2). The projecting band (5) projects on the inner circumferential surface of the gasket (2) throughout an entire circumference to form a ring-like shape, and inclines upward with respect to an axis (L) of the gasket (2). The first mold (3), when pressed into the gasket (2), presses the projecting band (5) to elastically deform it downward.

4 Claims, 19 Drawing Sheets

FOREIGN PATENT DOCUMENTS

| | | |
|---|---|---|
| JP | 02-153709 A | 6/1990 |
| JP | 04-049013 | 2/1992 |
| JP | 04-89309 U | 8/1992 |
| JP | 05-18107 Y | 5/1993 |
| JP | 05-85611 U | 11/1993 |
| JP | 06-023766 | 2/1994 |
| JP | 06-39951 Y | 10/1994 |
| JP | 06-098631 B | 12/1994 |
| JP | 09-254170 A | 9/1997 |

* cited by examiner

GASKET FOR MOLDING PLASTIC LENS

This is a non-provisional application claiming the benefit of International application number PCT/JP2004/016164 filed Oct. 29, 2004

TECHNICAL FIELD

The present invention relates to a gasket for molding a plastic lens which is used when molding a plastic lens by casting polymerization.

BACKGROUND ART

Casting polymerization is known as a method of molding a plastic lens. Casting Polymerization is a method of molding a plastic lens by filling a lens raw material liquid (to be referred to as a monomer hereinafter) into the cavity of a mold for molding the plastic lens and heating and polymerizing the monomer at a predetermined temperature to cure it (e.g., "Spectacles" Published by Medical Aoi Shuppan, May 22, 1986, pp. 83 to 85). Usually, a mold for molding a plastic lens comprises a pair of optical surface forming molds which form the optical surfaces (a convex surface and concave surface) of the plastic lens and a cylindrical gasket in which the molds are to be fitted at a predetermined gap from each other (e.g., Japanese Patent Publication No. 58-45940, Japanese Utility Model Publication No. 5-18107, Japanese Patent Publication No. 6-98631, and Japanese Utility Model Publication No. 6-39951).

As shown in FIGS. 26 to 28, a mold 200 for molding a plastic lens described in Japanese Patent Publication No. 58-45940 comprises first and second circular molds 201 and 202 and a cylindrical gasket 203 in which the molds 201 and 202 are to be incorporated.

The first mold 201 located on the upper side has a first lens molding surface (convex surface) 204a to mold a lens back surface (concave surface). The second mold 202 located on the lower side has a second lens molding surface (concave surface) 205a to mold a lens front surface (convex surface). The molds 201 and 202 are incorporated in the gasket 203 such that the lens molding surfaces 204a and 205a oppose each other.

The gasket 203 comprises a cylindrical gasket main body 203A, an annular overhang portion 203B which integrally projects on the central portion of the inner circumferential surface of the gasket main body 203A throughout the entire circumference, a collar portion 203C which integrally projects on the upper shoulder of the overhang portion 203B throughout the entire circumference, and a corner portion 203D which integrally projects on the lower shoulder of the overhang portion 203B throughout the entire circumference. A plurality of notches 206 are formed in each of the upper and lower end openings of the gasket main body 203A at necessary intervals. The collar portion 203C has an acute triangular sectional shape and integrally projects obliquely upward on the inner side surface at the upper end of the overhang portion 203B. The collar portion 203B is elastically deformable in the direction of plate thickness. The corner portion 203D does not project inside the overhang portion 203B but projects only downward.

To assemble the mold 200, first, the second mold 202 is placed on a support plate 207 such that its second lens molding surface 205a faces upward. The gasket 203 is inserted in the second mold 202 such that the lower opening of the gasket 203 matches the outer portion of the second mold 202, and the second mold 202 is forced into the gasket 203 until the distal end of the corner portion 203D comes into contact with the second lens molding surface 205a. A monomer is filled in a recess formed by the overhang portion 203B of the gasket 203 and the second lens molding surface 205a of the second mold 202. After that, the first mold 201 is fitted in the upper opening of the gasket 203, and the first lens molding surface 204a is urged against the collar portion 203C to elastically deform the collar portion 203C downward. When the first mold 201 is forced into the gasket 203, the excessive monomer in the gasket 203 overflows outside the gasket 203 from the notches 206 through the gaps between the gasket 203 and the first and second molds 201 and 202. At this time, when the force to push the first mold 201 into the gasket 203 is released, the downwardly flexed collar portion 203C is to be elastically restored upward. Thus, the inner space (cavity) of the gasket 203 which is sealed off by the first and second molds 201 and 202 enlarges, and its pressure becomes negative so as to hold the first and second molds 201 and 202 in tight contact with the collar portion 203C and corner portion 203D. Consequently, the interior of the gasket 203 is sealed well.

FIGS. 29A and 29B show a mold 300 for molding a plastic lens described in Japanese Utility Model Publication No. 5-18107. The molding mold 300 comprises first and second circular molds 301 and 302 and a gasket 303 into which the molds are to be pressed. The first mold 301 has a first lens molding surface (convex surface) 304a to mold a lens back surface (concave surface). The second mold 302 has a second lens molding surface (concave surface) 305a to mold a lens front surface (convex surface).

The gasket 303 comprises a cylindrical gasket main body 303A and a ring-like projecting band 303B which integrally projects on the inner circumferential surface of the gasket main body 303A. The ring-like projecting band 303B has a vertical inner circumferential surface, and its upper end portion 306 has an acute-angled hill-like sectional shape. The inner diameter of the gasket main body 303A is equal to or slightly smaller than the outer diameter of each of the first and second molds 301 and 302 which are to be fitted and inserted in the gasket main body 303A. To incorporate the first mold 301 in the gasket 303, the first mold 301 is pressed into the gasket 303 from the upper opening and forced until the first lens molding surface 304a comes into contact with the distal end of the upper end portion 306 of the projecting band 303B. At this time, the gasket main body 303A of the gasket 303 is stretched out in the diameter-increasing direction. When the force that presses the first mold 301 downward is released, the circumferential surface of the first mold 301 is kept clamped by the inner circumferential surface of the gasket main body 303A due to the shape restoring force of the gasket main body 303A, and the first mold 301 is held by the gasket main body 303A with the first lens molding surface 304a being in contact with the distal end of the upper end portion 306 of the projecting band 303B.

FIGS. 30 to 34 show still another conventional example of the mold for molding a plastic lens. In this conventional example, the inner circumferential surface of a gasket seals the circumferential surface of a mold. A mold 400 for molding a plastic lens comprises a cylindrical gasket 401 and first and second molds 402 and 403 which are to be fitted in the gasket 401.

The gasket 401 comprises a cylindrical gasket main body 401A which is made of an elastic plastic material, a ring-like projecting ridge 401B which integrally projects on the inner circumferential surface of the gasket main body 401A, and a monomer-filling filling port portion 401C which integrally projects on the outer circumferential surface of the gasket main body 401A.

The first and second molds 402 and 403 are cylindrically formed of glass. The first mold 402 to be incorporated on the upper side has a first lens molding surface 404a to mold the front surface (convex surface) of the lens. The second mold 403 to be incorporated on the lower side has a second lens molding surface 405a to mold the back surface (concave surface) of the lens. When the first and second molds 402 and 403 are pressed into the gasket 401 and incorporated in it such that the lens molding surfaces 404a and 405a oppose each other, circumferential surfaces (edge surfaces) 417 and 418 come into tight contact with an inner circumferential surface 406a of the gasket main body 401A to seal the gaps between the gasket main body 401A and the first and second molds 402 and 403, so as to prevent a monomer 410 to be filled into the gasket main body 401A from leaking and the atmosphere from entering. The upper and lower surfaces of the projecting ridge 401B serve to regulate the insertion amounts of the first and second molds 402 and 403 and position them.

DISCLOSURE OF INVENTION

Problem to be Solved by the Invention

Each of the conventional molds 200, 300, and 400 for molding the plastic lens described above has the following problems.

In the conventional mold 200 for molding the plastic lens shown in FIGS. 26 to 28, when the first mold 201 is held by the gasket 203, the collar portion 203C is pushed downward and flexes, as shown in FIG. 27B. The lens molding surface 204a of the first mold 201 comes into contact with the upper surface of the collar portion 203C through a large area to seal the gasket 203. Therefore, the monomer filled in the mold 200 enters the contact portion (to be also merely referred to a seal contact portion hereinafter) of the first lens molding surface 204a and the upper surface of the collar portion 203C by capillarity. In this state, the mold 200 is heated to a predetermined temperature to thermoset the monomer, and the first and second molds 201 and 202 and the gasket 203 are removed. Then, the monomer that entered the seal contact portion has cured to form resin tailings 220 that attach to the lens molding surface 204a of the first mold 201, as indicated by oblique lines in FIG. 28. Although the first and second molds 201 and 202 are to be cleaned and reused, the resin tailings 220 that attach in such a large area are difficult to remove.

In the mold 300 for molding the plastic lens shown in FIGS. 29A and 29B, the distal end of the upper end portion 306 of the ring-like projecting band 303B is in linear contact with the first lens molding surface 304a of the first mold 301. After the monomer polymerizes, when the molded lens is released, the monomer that entered the seal contact portion has cured to form resin tailings that linearly attach to the first lens molding surface 304a of the first mold 301. As the linearly attaching resin tailings have a smaller contact area than the resin tailings 220 shown in FIG. 28, they are comparatively easy to remove.

With the gasket 303 having the above structure, since the gap between first lens molding surface 304a and the upper end portion 306 of the projecting band 303B is not sufficiently sealed off, the monomer may leak outside the molding mold 300, or the atmosphere may enter the molding mold 300. More specifically, when the first lens molding surface 304a is urged against the distal end of the upper end portion 306 of the projecting band 303B which projects upward so as to seal the mold 301, an upward repelling force which is generated when the upper end portion 306 shrinks downward is used to generate a pressure between the first lens molding surface 304a and upper end portion 306, thus sealing the gap. The larger the forcing distance, the larger the repelling force generated by the shrinkage of the upper end portion 306 becomes sharply. It is, therefore, difficult to set a uniform pressure between the first lens molding surface 304a and upper end portion 306 appropriately throughout the entire circumference. In particular, as in the conventional mold 300, when the circumferential surfaces of the first and second molds 301 and 302 are to be clamped by the shrinking force in the diameter-reducing direction of the inner circumferential surface of the gasket 303 so as to hold the molds 301 and 302, the mold holding force of the inner circumferential surface of the gasket 303 may not withstand the repelling force of the upper end portion 306. Then, immediately after the first mold 301 is forced, or at a lapse of time after that, the first mold 301 may be pushed upward by the repelling force of the upper end portion 306. If, in this manner, the pressure of the seal contact portion is nonuniform throughout the entire circumference, or the first mold 301 is pushed upward by the repelling force of the upper end portion 306, a low-pressure portion or a gap may be formed in the seal contact portion, leading to a problem in sealing performance readily.

In the conventional molding mold 400 shown in FIGS. 30 to 34, due to the shrinkage of the monomer which takes place during the polymerization process, outer air is often drawn in a space surrounded by the gasket 401 and first and second molds 402 and 403, i.e., in a cavity 416. Thus, bubbles usually called a bubble defect may be generated in the lens.

The present inventors closely examined the bubble generation phenomenon, and found that the bubble defect occurred through the following process.

More specifically, the inner circumferential surface 406a of the gasket 401 forms a cylindrical surface which is parallel to an axis L of the gasket main body 401A. When the first and second molds 402 and 403 each having an outer diameter larger than the inner diameter of the gasket main body 401A are pressed into the gasket main body 401A, the gasket main body 401A elastically deforms in the diameter-increasing direction at its central portion to form a barrel shape, as shown in FIG. 31A. When the gasket main body 401A forms a barrel shape in this manner, edges 417a and 418a (to be also referred to as inner-side or lens molding surface side circumferential edges hereinafter) of the circumferential surfaces 417 and 418 of the first and second molds 402 and 403 on the first and second lens molding surfaces 404a and 405a sides are more likely to come into lighter contact (or form gaps) than edges 417b and 418b (to be also referred to as outer-side circumferential edges hereinafter) which are opposite to the first and second lens molding surfaces 404a and 405a. A bubble defect readily occurs in such a contact state.

FIGS. 31A, 31B, 31C, and 32 show typical examples of the contact state. The enlarged views shown in FIGS. 31B and 31C show an example in which those portions of the circumferential surfaces 417 and 418 of the first and second molds 402 and 403 which are farther away from the lens molding surface side circumferential edges 417a and 418a are in contact with the inner circumferential surface 406a of the gasket main body 401A with the higher the pressures. The circumferential surfaces 417 and 418 of the first and second molds 402 and 403 are in strong contact with the inner circumferential surface 406a of the gasket main body 401A at the outer-side circumferential edges 417b and 418b, to form, near the circumferential edges 417a and 418a on the lens molding surface sides, small gaps 420 and 421 with respect to the inner circumferential surface 406a (in FIGS. 31B and 31C, the gaps 420 and 421 are exaggerated for easy understanding). FIGS.

31B and 31C show a case wherein the gaps 420 and 421 are formed. A bubble defect also readily occurs when those portions of the circumferential surfaces 417 and 418 of the first and second molds 402 and 403 which are the nearer the lens molding surface side circumferential edges 417a and 418a are in the lighter contact with the inner circumferential surface 406a of the gasket main body 401A.

In the contact state shown in FIG. 32, although the outer-side circumferential edges 417b and 418b and the lens molding surface side circumferential edges 417a and 418a, of the circumferential surfaces 417 and 418 of the first and second molds 402 and 403 are in contact with the inner circumferential surface 406a of the gasket main body 401A, small gaps 422 and 423 are formed at the intermediate portion of the circumferential edges 417a and 417b and the intermediate portion of the circumferential edges 418a and 418b, respectively (the gaps are exaggerated in FIG. 32 for the sake of easy understanding). While the outer-side circumferential edges 417b and 418b are in strong contact with the inner circumferential surface 406a of the gasket main body 401A, the lens molding surface side circumferential edges 417a and 418a are in light contact with the inner circumferential surface 406a. FIG. 32 shows a case wherein the gaps 422 and 423 are formed at the intermediate portions of the two circumferential edges 417a and 417b and the two circumferential edges 418a and 418b. A bubble defect also readily occurs when the intermediate portions are in lighter contact than the outer-side circumferential edges 417a and 418a and the inner-side circumferential edges 417b and 418b.

The first and second molds 402 and 403 may be in contact with the inner circumferential surface 406a of the gasket main body 401A, as described above, throughout the entire circumference of the inner circumferential surface 406a, or partially. The different contacts state as described above may mix in the circumferential direction of the inner circumferential surface 406a. In what contact state the inner circumferential surface 406a of the gasket main body 401A may be with the circumferential surfaces 417 and 418 of the first and second molds 402 and 403 depends on the edge thicknesses of the first and second molds 402 and 403, the thickness of the gasket main body 401A, the relationship between the inner diameter of the gasket main body 401A and the outer diameters of the first and second molds 402 and 403, the gap between the first and second molds 402 and 403 that form a pair, and the like.

How a bubble defect occurs when the circumferential surfaces 417 and 418 of the first and second molds 402 and 403 are in contact with the inner circumferential surface 406a of the gasket main body 401A, as described above, will be described.

While the circumferential surfaces 417 and 418 of the first and second molds 402 and 403 are in contact with the inner circumferential surface 406a of the gasket main body 401A, as shown in FIGS. 31A to 31C, assume that the pair of molds 402 and 403 are pressed into the gasket 401. If the monomer 410 is filled into the cavity 416 of the molding mold 400 from the filling port portion 401C, part of the monomer 410 enters the gap 420 through the gap between the first mold 402 and the projecting ridge 401B, and the gap 421 through the gap between the second mold 403 and the projecting ridge 401B by capillarity. A leakage monomer 410' (FIGS. 33 and 34) that has entered the gaps 420 and 421 is drawn to the narrower portions of the gaps 420 and 421 to enter portions where the inner circumferential surface 406a of the gasket main body 401A is in strongest contact with the circumferential surfaces 417 and 418 of the first and second molds 402 and 403. More specifically, the leakage monomer 410' gathers on those ends 417b and 418b of the circumferential surfaces 417 and 418 of the first and second molds 402 and 403 which are opposite to the edges on the lens molding surfaces 404a and 405a sides, and spreads in the form of bands in the circumferential direction to seal the gaps between the gasket main body 401A and the inner-side circumferential edges 417b and 418b. Simultaneously, residual air 430 (FIG. 33) occurs in the gap 420 which is inside the band-like leakage monomer 410'. The gaps 420 and 421 are V-shaped gaps that spread inward. Thus, the band of the leakage monomer 410' is held near the outer-side circumferential edges 417b and 418b of the first and second molds 402 and 403. The holding force gradually decreases toward the inner-side circumferential edges 417a and 418a to become unstable. In addition, the difference in holding force is small between the two ends of the circumferential surfaces 417 and 418 of the first and second molds 402 and 403. Hence, the band of the leakage monomer 410' is readily moved toward the inner-side circumferential edges 417a and 418a even with a comparatively small force and deforms.

When the monomer 410 shrinks (by about 7% to 15%) in the polymerization process, the pressure in the cavity 416 becomes negative. At this time, if a weak portion 431 (FIG. 33) with a comparatively low sealing pressure exists in the seal portion of the inner circumferential surface 406a of the main body 401A and the circumferential surface 417 or 418 of the mold 402 or 403, the leakage monomer 410' at this weak portion 431 is readily deformed inward by an external pressure, as shown in FIG. 34, due to the reason described above. When the deformed portion reaches that portion of the gap 420 which has spread to a predetermined degree or more, the band of the leakage monomer 410' breaks, and a broken portion 432 communicates with the outside of the molding mold 400. Outer air flows in through the broken portion 432 and is drawn into the cavity 416 through the gap 420. Consequently, voids (bubbles) are formed in the lens, which phenomenon is usually called a bubble defect, to render the lens defective.

A case will be described wherein the gasket main body 401A is in a contact state with the first and second molds 402 and 403 as shown in FIG. 32. In this case as well, in the same manner as in the contact state shown in FIGS. 31B and 31C, the monomer 410 flows through the gaps between the projecting ridge 401B and the first and second molds 402 and 403 and reaches the gaps between the inner circumferential surface 406a of the gasket main body 401A and the circumferential surfaces 417 and 418 of the first and second molds 402 and 403. As the inner-side circumferential edges 417a and 418a of the circumferential surfaces 417 and 418 of the first and second molds 402 and 403 are in stronger contact than the intermediate portions of the circumferential surfaces 417 and 418, the leakage monomer 410' is to gather near the inner-side circumferential edges 417a and 418a. If the leakage monomer 410' reaches near the outer-side circumferential edges 417b and 417b even partly, as the outer-side circumferential edges 417b and 418b are in stronger contact than the inner-side circumferential edges 417a and 418a, the leakage monomer 410' is drawn to near the outer-side circumferential edges 417b and 418b. The leakage monomer 410' then spreads in the form of bands along the outer-side circumferential edges 417b and 418b to seal the gaps between the gasket main body 401A and the first and second molds 402 and 403. Hence, residual air occurs on the lens molding surface sides of the gaps between the inner circumferential surface 406a of the gasket main body 401A and the circumferential surfaces of the first and second molds 402 and 403. Even in this case, when the pressure in the cavity 416 becomes negative, the band of the leakage monomer 410' breaks due to the same reason as that of the case with the contact state shown in FIGS. 31B and 31C. The outer air enters the cavity 416 through those contact portions between the inner circumferential surface 406*a* of the gasket main body 401A and the inner-side circumferential edges 417*a* and 418*a* where sealing is insufficient, thus causing a bubble defect.

In order to solve this problem, the present inventors conducted experiments by changing the shape of the gasket 401. When the inner-side circumferential edges 417*a* and 418*a* of the first and second molds 402 and 403 were brought into stronger contact than the outer-side circumferential edges 417*b* and 418*b*, good sealing could be obtained, and a bubble defect caused by monomer leakage and entering air could be prevented. More specifically, when the inner diameters of those innermost portions of the inner circumferential surface 406*a* of the gasket 401 into which the first and second molds 402 and 403 are to be pressed are decreased to be smaller than the outer-side inner diameters, the inner-side circumferential edges 417*a* and 418*a* of the first and second molds 402 and 403 can be brought into stronger contact than the outer-side circumferential edges 417*b* and 418*b*.

According to another method, those portions of the inner circumferential surface of the gasket 401 with which the inner-side circumferential edges 417*a* and 418*a* of the circumferential surfaces 417 and 418 of the first and second molds 402 and 403 are to come into contact form small-diameter cylindrical surface portions with heights smaller than the edge thicknesses of the molds 402 and 403. Portions which are on the outer sides in the axial direction of the small-diameter cylindrical surface portions form relief portions which enlarge on the outer sides in the radial direction of the small-diameter cylindrical surface portions. Then, the inner-side circumferential edges 417*a* and 418*a* of the first and second molds 402 and 403 can be brought into stronger contact than the outer-side circumferential edges 417*b* and 418*b*.

The present invention has been made to solve these conventional problems, and has as its object to provide a gasket for molding a plastic lens, in which the lens molding surface of a mold is brought into tight linear contact with the gasket so that the gasket can be sealed reliably.

It is another object of the present invention to provide a gasket for molding a plastic lens, in which a bubble defect caused by monomer leakage and air drawing can be prevented reliably.

Means of Solution to the Problem

In order to achieve the above objects, according to the present invention, there is provided a gasket for molding a plastic lens, comprising a cylindrical gasket main body in which a first mold with a lens molding surface that forms one lens surface of the plastic lens and a second mold with a lens molding surface that forms the other lens surface of the plastic lens are incorporated to be spaced apart from each other at a predetermined gap, and an elastic projecting band which integrally projects on an inner circumferential wall of the gasket main body throughout an entire circumference, wherein the projecting band includes a proximal end portion and a tapered distal end portion, the distal end portion forms an angle closer to that of an axial direction of the gasket main body than the proximal end portion, and the lens molding surface of one of the first mold and the second mold comes into contact with a vertex of the distal end portion.

According to the present invention, there is also provided gasket for molding a plastic lens, comprising a cylindrical gasket main body in which a first mold with a lens molding surface that forms one lens surface of the plastic lens and a second mold with a lens molding surface that forms the other lens surface of the plastic lens are incorporated to be spaced apart from each other at a predetermined gap, wherein the gasket main body includes a portion which, when at least one of the first mold and the second mold is pressed into the gasket main body, seals a circumferential surface of one mold, and an inner diameter of an inner circumferential surface of the portion which seals the circumferential surface of one mold is smallest at a portion with which a circumferential edge of one mold on a lens molding surface side comes into contact.

EFFECT OF THE INVENTION

In the present invention which comprises an elastic projecting band on the inner circumferential wall of a gasket main body, the distal end side of the projecting band is closer to the axial direction of the gasket main body than the proximal portion side. When the first mold is urged against the projecting band, the proximal portion side flexes toward the axis of the gasket more readily than the distal end side. Accordingly, the contact angle formed by the distal end of the projecting band and the lens molding surface of the mold is maintained large by the flex of the proximal portion side. Hence, the distal end of the projecting band comes into linear contact with the lens molding surface of the mold to obtain a high surface pressure. The resin tailings that attach to the lens molding surface of the mold which is removed from the gasket after lens molding are linear and are accordingly easy to remove. When the projecting band is urged by the mold, it elastically deforms toward the axis of the gasket and flexes. Thus, the contact pressure of the mold does not sharply change according to the distance by which the mold is urged against the projecting band, and an appropriate contact pressure can be easily set throughout the entire circumference of the lens molding surface.

In the present invention, the inner diameter of the gasket main body is set smallest at the portion with which the circumferential edge of the first lens on the lens molding surface side comes into contact. According to the present invention, when the mold is pressed into the gasket main body, that circumferential edge of the circumferential surface of the mold which is on the lens molding surface side comes into strongest contact with the inner circumferential surface of the gasket, thus sealing the gasket. When a monomer is filled into the cavity, part of the monomer enters the gap between a portion near the circumferential edge of the mold on the lens molding surface side and the inner circumferential surface of the gasket main body due to capillarity. Thus, the gap is sealed by the monomer, and monomer leakage is prevented. The leakage monomer that stays in the gap between the inner circumferential surface of the gasket main body and the portion near the circumferential edge of the mold on the lens molding surface side is held by the strong holding force of the capillarity. Even if the pressure in the cavity becomes negative due to polymerizing shrinkage of the monomer in the cavity, the leakage monomer is held stable. Therefore, the outer air does not break into the staying leakage monomer to enter the cavity. As a result, a bubble defect does not occur, and a fraction defective can be decreased.

BEST MODE FOR CARRYING OUT THE INVENTION

Figure 1A:
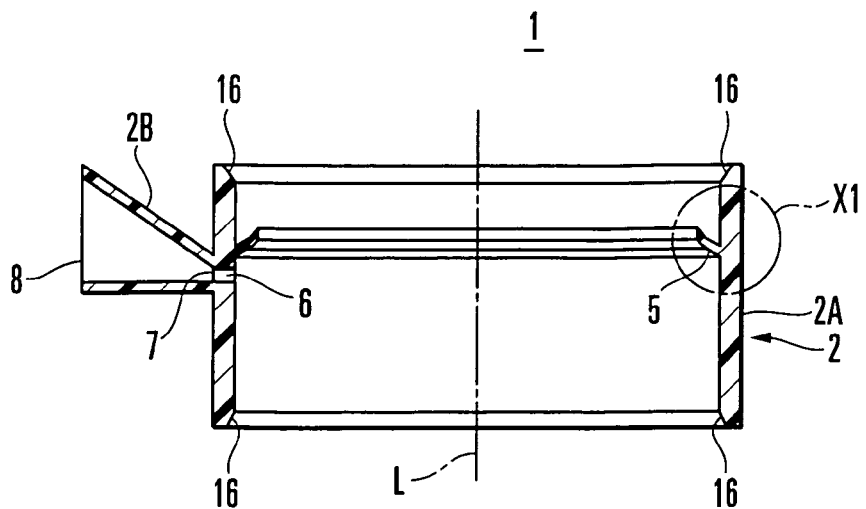
FIG. 1A is a sectional view showing a gasket for molding a plastic lens according to the first embodiment of the present invention.
Figure 1B:
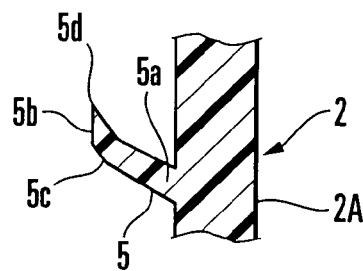
FIG. 1B is an enlarged view of a portion X1 of FIG. 1A.
Figure 2:
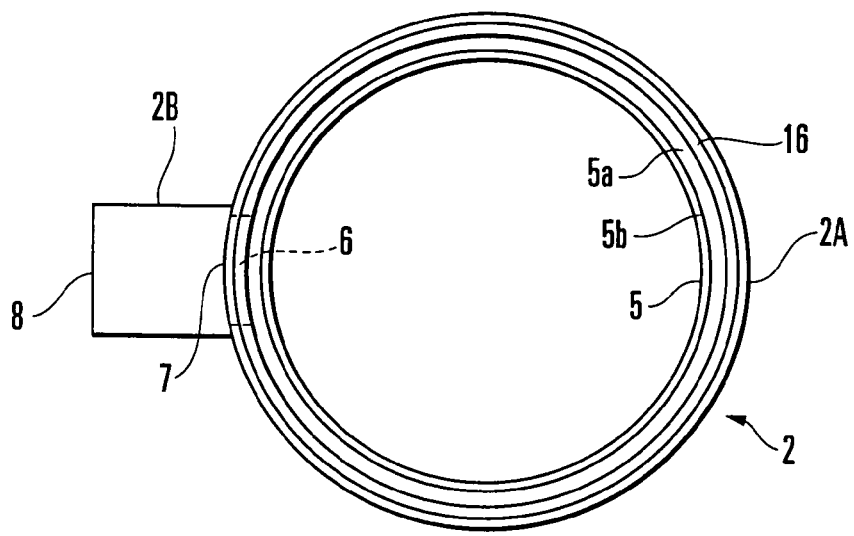
FIG. 2 is a front view of the gasket according to the first embodiment.

The present invention will be described in detail with reference to the embodiments shown in the drawings.

Referring to FIGS. 1A, 1B, 2, 3A, and 3B, a mold denoted by reference numeral 1 for molding a plastic lens comprises a cylindrical gasket 2 and a pair of molds 3 and 4 which are to be incorporated in the gasket 2 to be spaced apart from each other at a predetermined interval. In the following description, the upper mold 3 will also be referred to as the first mold 3, and the lower mold 4 will also be referred to as the second mold 4.

The gasket 2 is formed by injection molding of a synthetic resin and comprises a cylindrical gasket main body 2A which has two open ends, and a filling port portion 2B which integrally projects on the outer circumferential surface of the gasket main body 2A. The inner diameter of the gasket main body 2A is smaller than the outer diameter of each of the molds 3 and 4 so the gasket main body 2A can hold the first and second molds 3 and 4 to be inserted in it. In this embodiment, tapers 16 are formed on the respective openings on the two sides of the gasket main body 2A so as to facilitate insertion of the molds 3 and 4. An elastically deformable ring-like projecting band 5 integrally projects on the intermediate portion in the direction of height of the inner circumferential surface of the gasket main body 2A along the circumference throughout the entire circumference.

A proximal portion 5a of the projecting band 5 inclines obliquely upward. A distal end portion 5b of the projecting band 5 inclines obliquely upward at an angle (an angle close to that of the direction of an axis L of the gasket main body 2A) acuter than that of the proximal portion 5a side. The proximal portion 5a and distal end portion 5b of the projecting band 5 are connected to each other in a bent manner at a bent portion 5c. The distal end portion 5b of the projecting band 5 has a triangular (v-shaped) sectional shape so it tapers toward its distal end. A vertex 5d of the distal end portion 5b forms a ridge line with the same height throughout the entire circumference.

A filling hole 6 through which the interior of the gasket 2 communicates with the interior of the filling port portion 2B is formed under the projecting band 5 in the circumferential wall of the gasket main body 2A. The filling hole 6 forms a slit which is long in the circumferential direction of the gasket main body 2A. When a plastic lens with a small edge thickness such as a plus-power lens is to be molded, the filling hole 6 may be formed immediately under the proximal portion 5a of the projecting band 5.

Figure 3A:
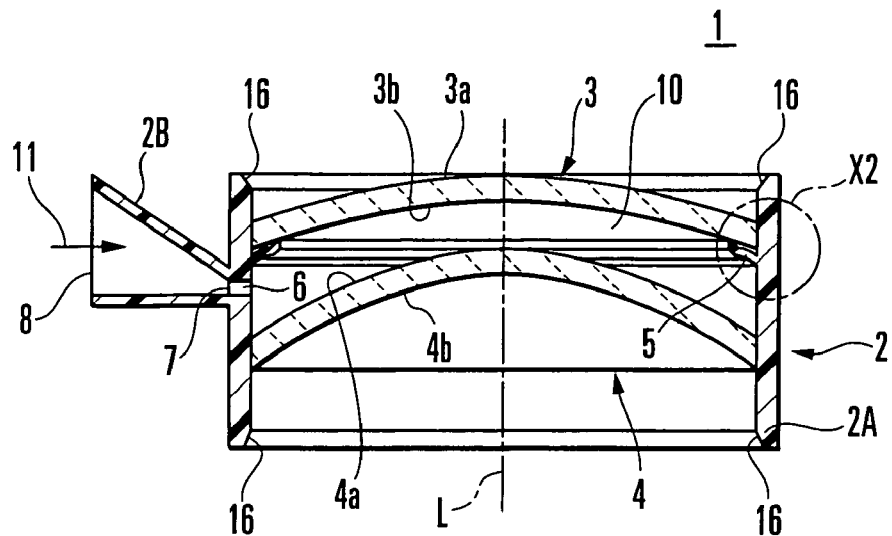
FIG. 3A is a sectional view showing a state wherein a mold is incorporated in the gasket according to the first embodiment.

The filling port portion 2B is a portion through which a monomer 11 is filled into the gasket main body 2A when molding a plastic lens. In FIG. 3A, the filling port portion 2B forms a funnel-like shape such that its longitudinal section which is parallel to the surface of the sheet of drawing is triangular. The filling port portion 2B has an inner opening 7 and outer opening 8. The inner opening 7 communicates with the filling hole 6 of the gasket main body 2A, and forms a horizontally long slit which is substantially identical to the shape of the filling hole 6. The outer opening 8 is a rectangular opening formed on the opposite side to the inner opening 7, and has a maximal sectional area.

Regarding the material of the gasket 2, a monomer (e.g., a diethylene glycol bisallyl carbonate-based resin or polyurethane-based resin) for a general spectacle lens has a high polymerizing shrinkage factor of about 7% to 15%. A material with physical properties including flexibility and pliability (elasticity) is selected, so that when the monomer is filled in the mold 1 for molding the plastic lens and polymerizes, the molds 3 and 4 can move to follow the polymerizing shrinkage. Generally, a thermoplastic material such as a polyethylene-based resin, e.g., an ethylene-vinyl acetate copolymer or ethylene-propylene copolymer, is used (e.g., Japanese Patent Laid-Open Nos. 2-185586, 5-8230, 8-302336, 2000-191846, and 2000-190342). A particularly preferable material is an ultralow-density polyethylene resin which is used in this embodiment.

Figure 3B:
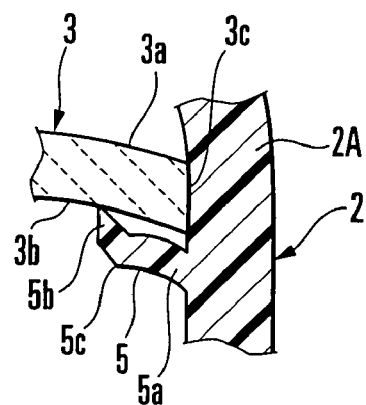
FIG. 3B is an enlarged view of a portion X2 of FIG. 3A.

The above materials have elasticity. When the inner diameter of the gasket 2 is smaller than the outer diameter of each of the molds 3 and 4 which are to be incorporated in the gasket 2, the gasket 2 elastically deforms in the diameter-increasing direction to allow the molds 3 and 4 to be pressed into and held by the gasket 2. More specifically, as shown in FIG. 3B, when the mold 3 is pressed into the gasket main body 2A from the upper opening, that portion of the gasket main body 2A into which the mold 3 is pressed elastically deforms in the diameter-increasing direction, and the restoring force of the gasket main body 2A fastens and holds the circumferential surface of the mold 3. When the mold 4 is pressed into the gasket main body 2A as well, the gasket main body 2A increases in diameter in the same manner. The holding force of the gasket 2 for the molds 3 and 4 can cope with polymerizing shrinkage of the monomer. The relationship among the outer diameters of the molds 3 and 4 and the material and shape of the gasket 2 is designed in advance by considering the behaviors of the gasket 2 and molds 3 and 4 during polymerization.

The pair of molds 3 and 4 are made of circular glass members and formed into menisci having the same outer diameter. One surface of the first mold 3 forms a moderately curved convex surface 3a, and its other surface also forms a moderately curved concave surface 3b. The first mold 3 is pressed into the gasket 2 such that the concave surface 3b is on the inner side. The convex surface 3a is a surface that is not used as a lens molding surface, and forms an arbitrary finished surface. The concave surface 3b forms a transfer surface (lens molding surface) for the convex surface side of the plastic lens that is to be molded. Thus, the concave surface (to be also referred to as a lens molding surface hereinafter) 3b is planished to have a predetermined curved surface. In this embodiment, as the concave surface 3b, one that forms an axi-rotationally symmetric curved surface is used. Thus, the height of the lower end of a circumferential surface 3c of the first mold 3 is substantially the same throughout the entire circumference.

One surface of the second mold 4 forms a convex surface 4a, and its other surface forms a concave surface 4b. The second mold 4 is pressed into the gasket 2 such that the convex surface 4a is on the inner side. The convex surface 4a forms a transfer surface (lens molding surface) for the concave surface side of the plastic lens that is to be molded, and is accordingly planished to have a predetermined curved surface. The concave surface 4b is a surface that is not used as a lens molding surface, and forms an arbitrary finished surface.

When the pair of molds 3 and 4 are assembled in the gasket 2 by forcing them into the gasket 2 by predetermined amounts such that the lens molding surfaces 3b and 4a oppose each other, as shown in FIG. 3A, assembly of the mold 1 for molding the plastic lens is completed. In this case, as the first mold 3 is positioned by being pressed in with a predetermined pressure, its forcing amount into the gasket 2 is substantially constant regardless of the type of the lens to be molded. In contrast to this, the second mold 4 is forced by a forcing amount that matches the type (dioptric power) of the lens to be molded, so it opposes the first mold 3 at a predetermined gap. Thus, the space surrounded by the gasket 2 and two molds 3 and 4 forms a cavity 10 for molding the plastic lens. The monomer 11 is filled into the cavity 11 from the filling port portion 2B through the filling hole 6. Obviously, the pair of molds 3 and 4 can be vertically reversed and incorporated in the gasket 2 to assemble the mold 1 for molding the plastic lens.

In the mold 1 for molding the plastic lens which has the above structure, when the first mold 3 is pressed into the gasket 2 from the upper opening, the peripheral portion of the lens molding surface 3b of the first mold 3 presses the distal end portion 5b of the elastically deformable projecting band 5, as shown in FIG. 3A. The distal end portion 5b side of the projecting band 5 inclines at an angle (an angle closer to that of the direction of the axis L of the gasket main body 2A) acuter than that of the proximal portion 5a side. When being pressed in the direction of the axis L, the proximal portion 5a side flexes toward the axis L more readily. Particularly, in this embodiment, since the proximal portion 5a side is connected to the distal end portion 5b side in a bent manner, the flexibility toward the axis L largely changes at the bent portion 5c as the boarder, and the proximal portion 5a side flexes more largely. The length from the bent portion 5c to the distal end portion 5b side is smaller than the length from the bent portion 5c to the proximal portion 5a side, so the proximal portion 5a side flexes further more readily. Therefore, when the distal end portion 5b of the projecting band 5 is pressed by the lens molding surface 3b of the first mold 3, the proximal portion 5a side flexes toward the axis L. The flexing amount in the radial direction of the distal end portion 5b side decreases by the flex of the proximal portion 5a side. Thus, the distal end portion 5b comes into tight linear contact with the lens molding surface 3b while maintaining a certain degree of contact angle. The projecting band 5 is to bring its distal end portion 5b into tight contact with the lens molding surface 3b by the restoring force accompanying its elastic deformation. Hence, good sealing is ensured between the lens molding surface 3b of the first mold 3 and the distal end portion 5b of the projecting band 5.

Figure 29A:
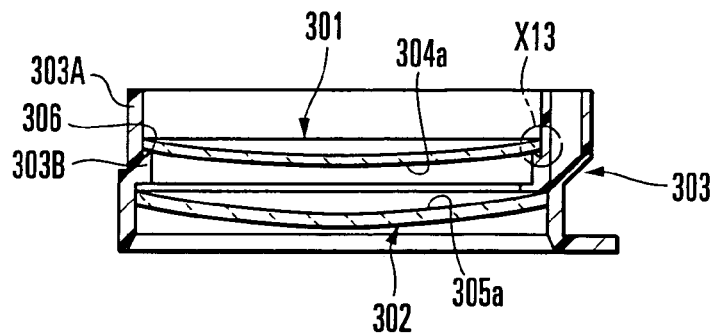
FIG. 29A is a sectional view before assembly to show another conventional mold for molding a plastic lens.
Figure 29B:
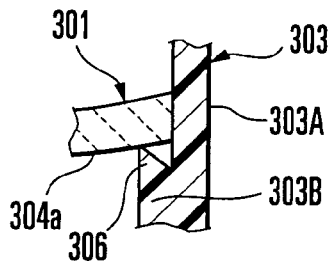
FIG. 29B is an enlarged view of a portion X13 of FIG. 19A.
Figure 30:
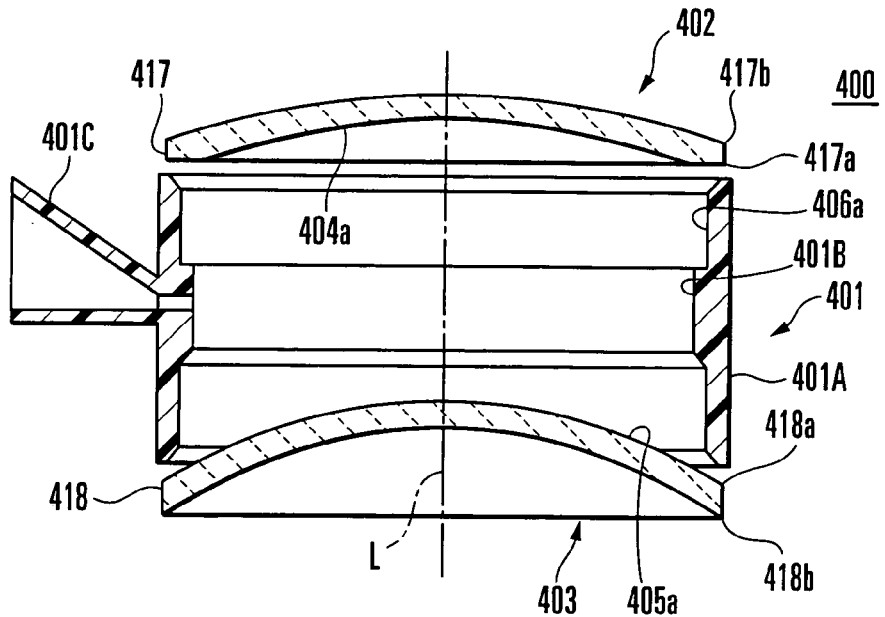
FIG. 30 is a sectional view before assembly to show still another conventional gasket for forming a plastic lens.
Figure 31A:
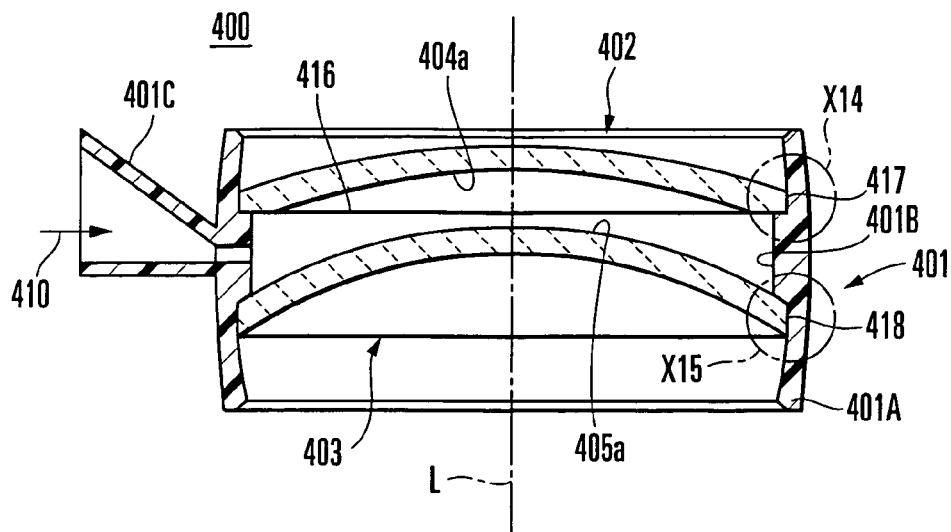
FIG. 31A is a sectional view after assembly.
Figure 31B:
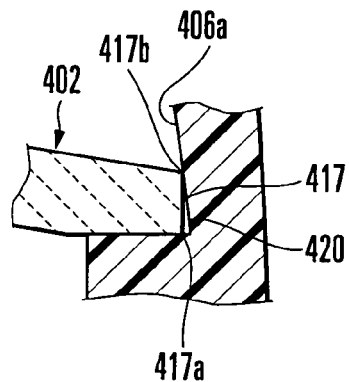
FIGS. 31B and 31C are enlarged views of portions X14 and X15, respectively, of FIG. 31A.
Figure 31C:
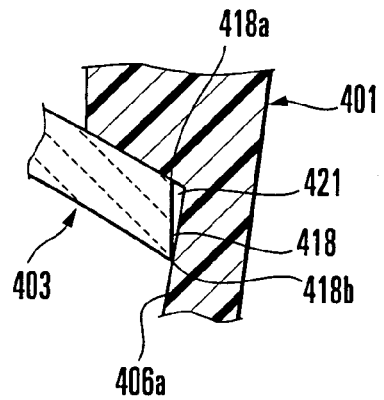
Figure 32:
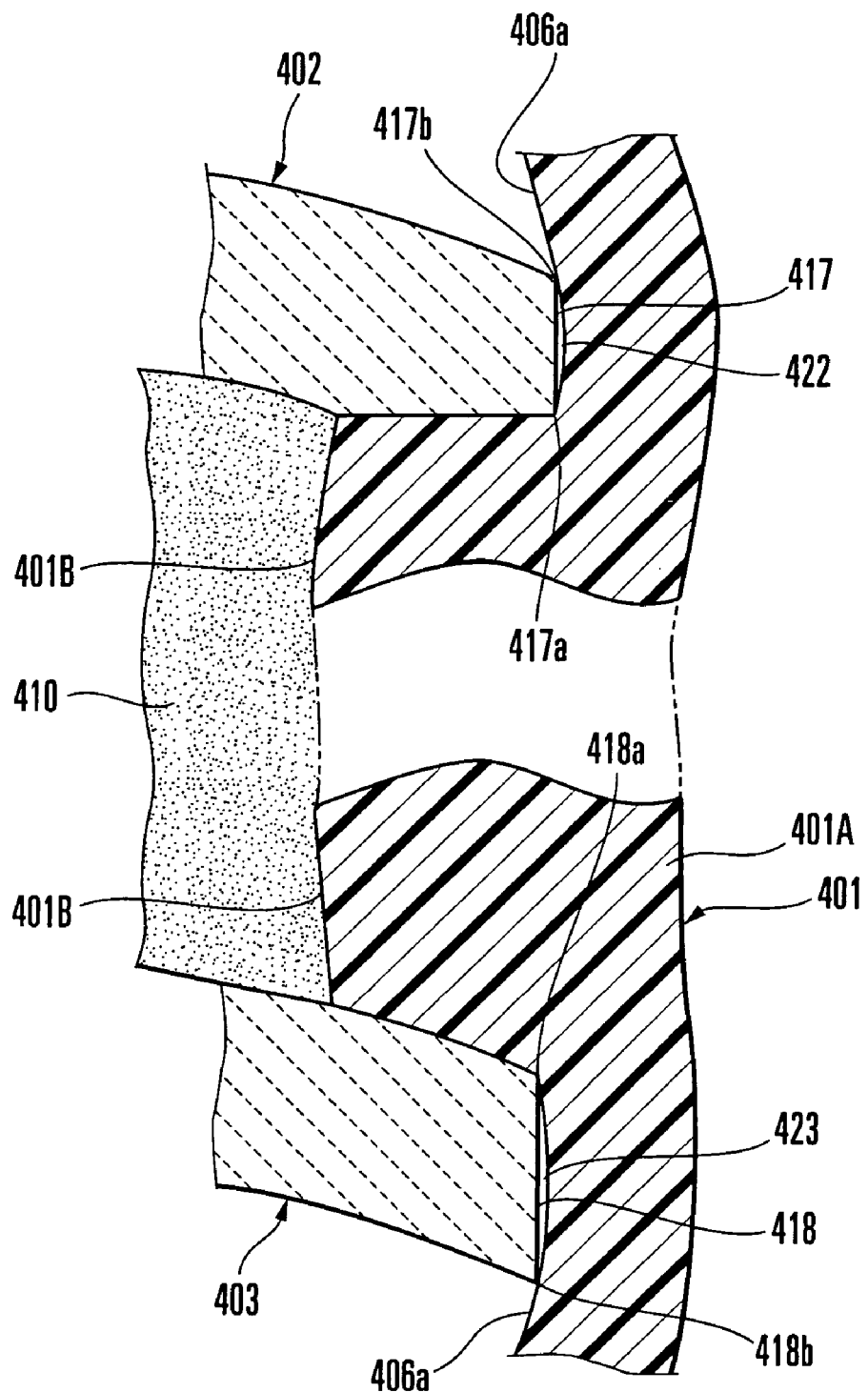
FIG. 32 is an enlarged sectional view of the main part.
Figure 33:
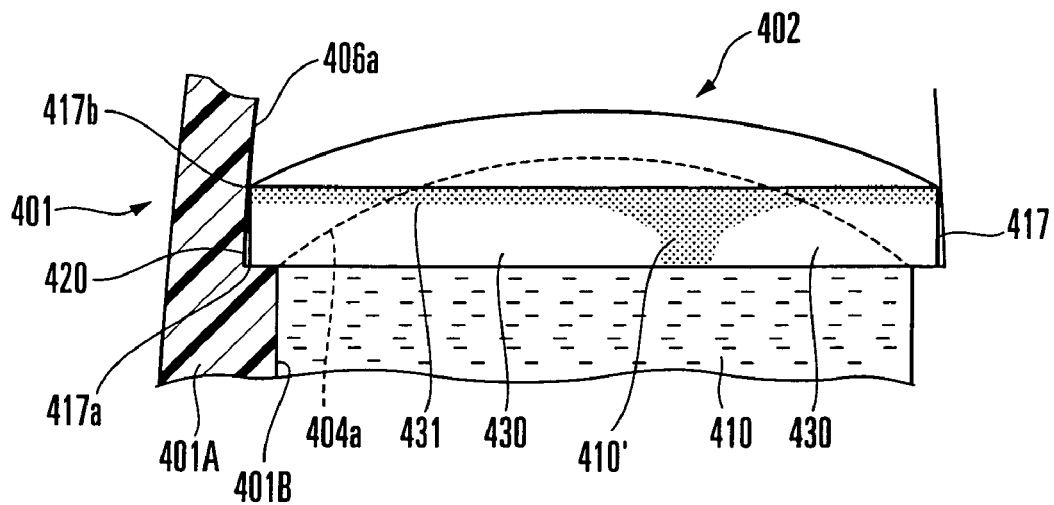
FIG. 33 is a view showing a leakage monomer which leaks into a gap by capillarity.
Figure 34:
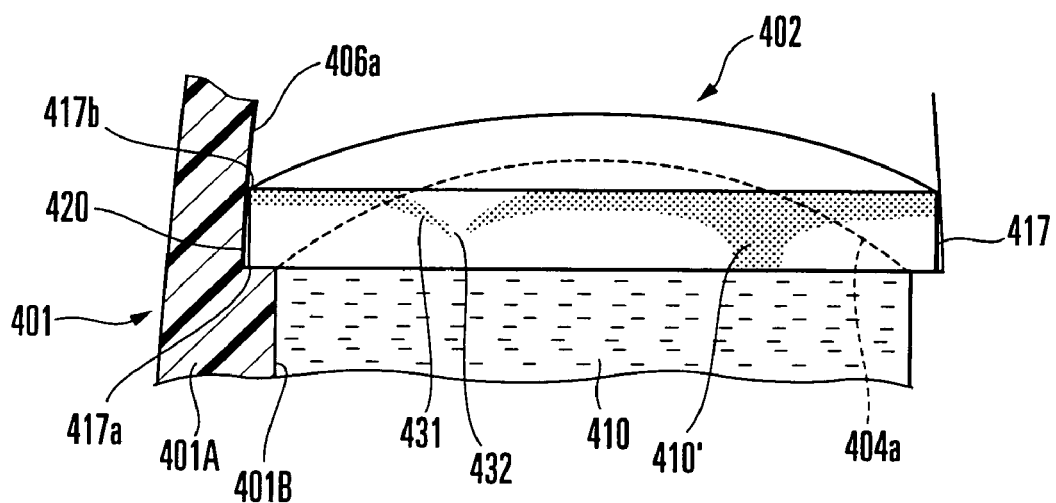
FIG. 34 is a view showing deformation and break of the leakage monomer caused by an external pressure.

In this manner, according to this embodiment, as the distal end portion 5b of the projecting band 5 comes into tight linear contact with the lens molding surface 3b of the first mold 3, the contact area decreases. Thus, a high surface pressure can be obtained, and the gasket 2 can be sealed reliably. As the proximal portion 5a side of the projecting band 5 flexes toward the axis L of the gasket 2, even if the forcing amount of the first mold 3 slightly changes, the distal end portion 5b can be brought into tight linear contact with the lens molding surface 3b. In addition, the restoring force against the forcing amount of the mold 3 fluctuates less than in the case of the conventional gasket 303 shown in FIGS. 29A and 29B in which tight contact is obtained by using the restoring force against shrinking deformation of the projecting portion 303B. Even when the mold 3 is to be held by the inner circumferential surface of the gasket 2, after the mold 3 is forced into the gasket 2, the mold 3 will not be pushed up to float. Even when the forcing amount is slightly nonuniform in the circumferential direction, the gasket 2 is sealed with an appropriate pressure throughout the entire circumference of the lens molding surface 3b of the mold 3.

As described above, the gasket 2 of this embodiment can be sealed well with an appropriate pressure throughout the entire circumference of the lens molding surface 3b of the mold 3. The monomer 11 will not leak outside the molding mold 1 through the gap between the first mold 3 and projecting band 5, or the outer air will not enter the cavity 10 during polymerizing shrinkage of the monomer 11. Thus, a molding defect can be prevented.

Figure 4:
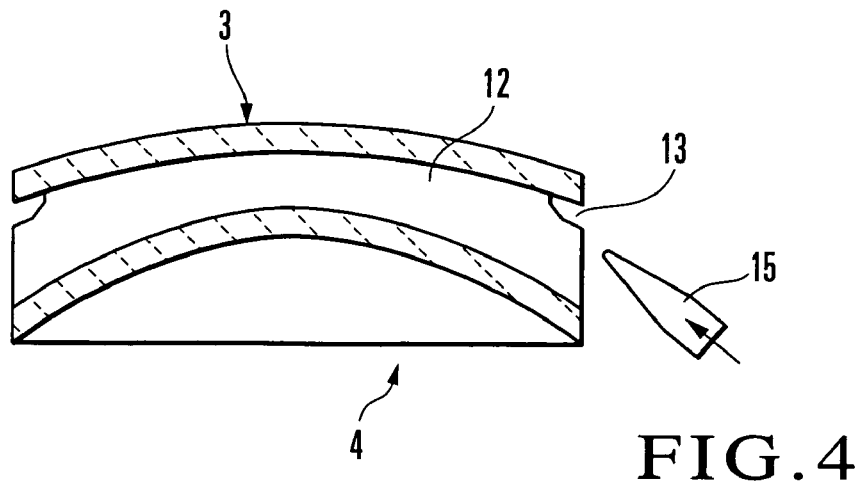
FIG. 4 is a view for explaining release of the first mold.

The molded lens can be easily removed from the first mold 3. More specifically, after the lens is molded by heat polymerization of the monomer 11, the first and second molds 3 and 4 may be extracted by, e.g., breaking the gasket 2. The first and second molds 3 and 4 are still in integral tight contact with the upper and lower surfaces of a molded lens 12, as shown in FIG. 4. A V-shaped groove 13 is formed between the peripheral portion of the lens 12 on the upper surface side and the first mold 3 throughout the entire circumference by removing the projecting band 5. When a wedge-shaped tool 15 is inserted in the groove 13, the lens 12 can be easily separated from the first mold 3 by the wedge action. When separating the lens 12 from the second mold 4, a spatula-like tool is inserted in the bonding portion of the circumferential surface of the lens 12 and the second mold 4.

Figure 5A:
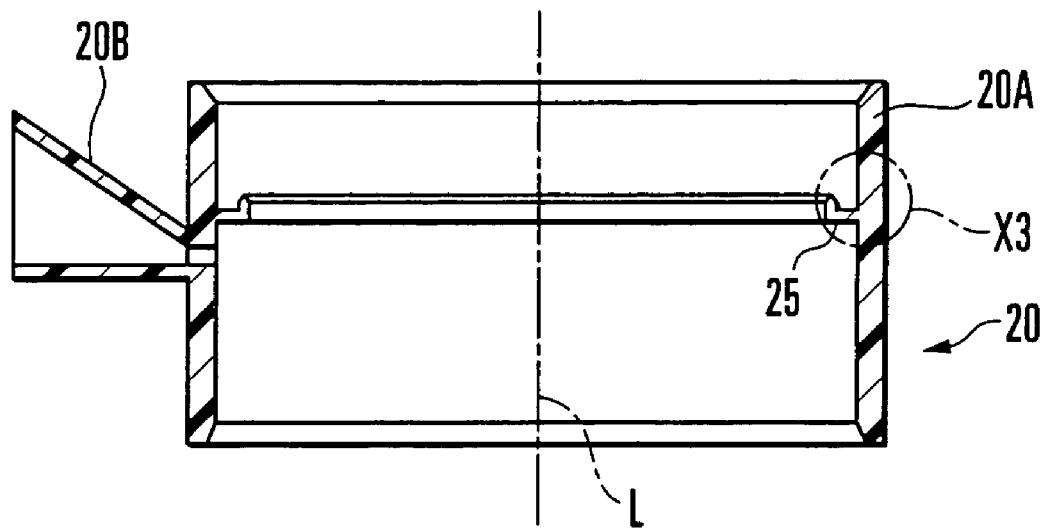
FIG. 5A is a sectional view of a molding gasket according to the second embodiment of the present invention.
Figure 5B:
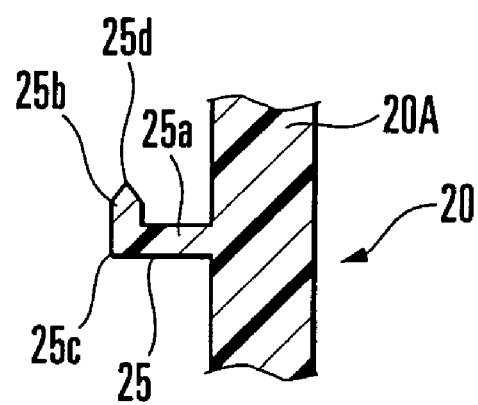
FIG. 5B is an enlarged view of a portion X3 of FIG. 5A.
Figure 6A:
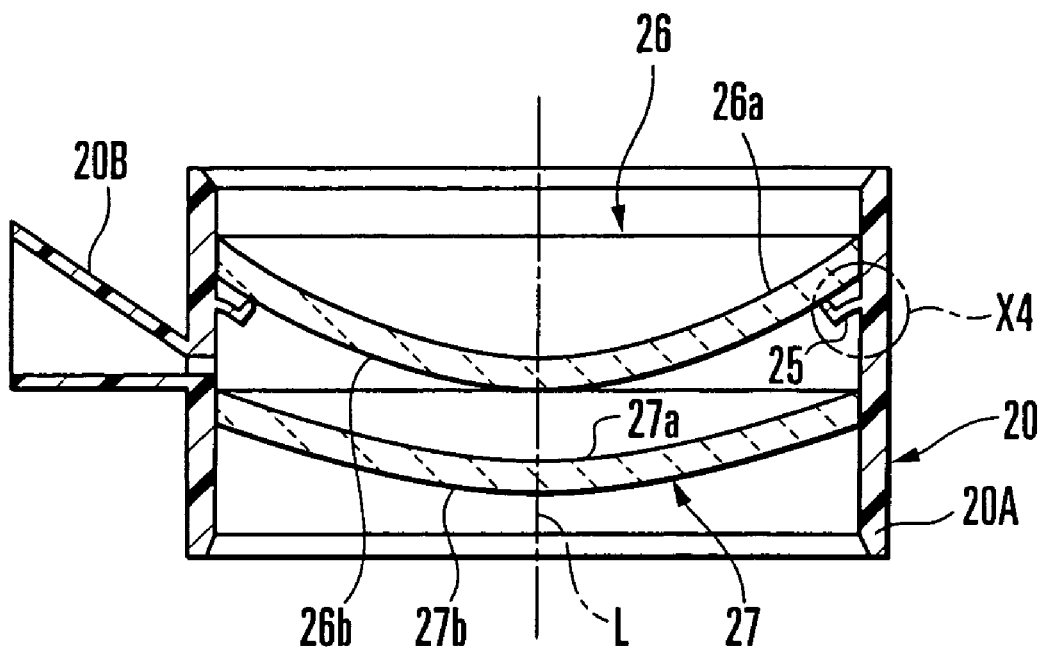
FIG. 6A is a sectional view showing a state wherein a mold is incorporated in the gasket according to the second embodiment.
Figure 6B:
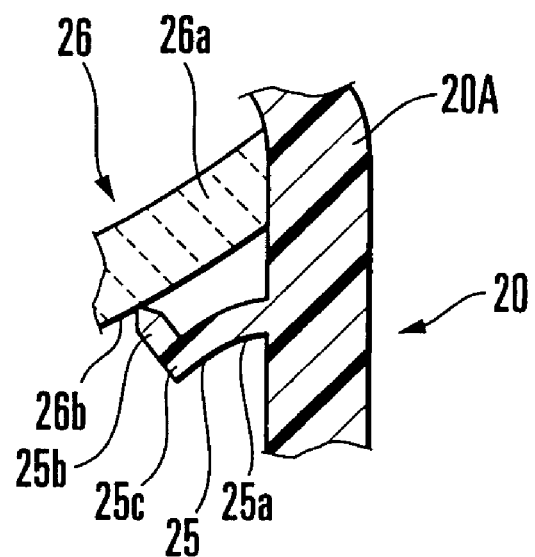
FIG. 6B is an enlarged view of a portion X4 of FIG. 6A.

FIG. 5A is a sectional view of a gasket according to the second embodiment of the present invention, and FIG. 5B is an enlarged view of a portion X3 of FIG. 5A. FIG. 6A is a sectional view showing a state wherein a mold is incorporated in the gasket, and FIG. 6B is an enlarged view of a portion X4 of FIG. 6A. According to the second embodiment, a gasket 20 comprises a cylindrical gasket main body 20A, a filling port portion 20B which integrally projects on the outer circumferential surface of the gasket main body 20A, and an elastically deformable projecting band 25 which integrally projects on the inner circumferential surface of the gasket main body 20A throughout the entire circumference. A proximal portion 25a side of the projecting band 25 extends in a direction substantially perpendicular to an axis L of the gasket main body 20A, and its distal end portion 25b side extends in a direction substantially parallel to the axis L. The proximal portion 25a side is connected to the distal end portion 25b side substantially at a right angle at a bent portion 25c. The distal end portion 25b side has a triangular section, and its vertex 25d is located immediately on it. The vertex 25d is in linear contact with a lens molding surface 26b of a first mold 26. An upper surface 26a of the first mold 26 forms a concave surface, and its lens molding surface 26b forms a lens molding convex surface. An upper surface 27a of a second mold 27 forms a lens molding concave surface, and its lower surface 27b forms a convex surface.

In the gasket 20 having the above structure, in the same manner as in the first embodiment shown in FIG. 1A, when the lens molding surface 26b of the first mold 26 is urged against the distal end portion 25b of the projecting band 25, the proximal portion 25a side flexes toward the axis L of the gasket main body 20A, and the distal end portion 25b comes into tight linear contact with the lens molding surface 4a. Thus, the gap between the lens molding surface 26b of the first mold 26 and the distal end portion 25b of the projecting band 25 can be sealed reliably. Therefore, in the second embodiment, the same effect as that of the first embodiment can be obtained. According to the second embodiment, the distal end portion 25b side of the projecting band 25 is perpendicular to the proximal portion 25a side. The length from the distal end portion 25b to the bent portion 25c is smaller than the length from the proximal portion 25a to the bent portion 25c. Thus, the distal end portion 25b side hardly flexes. Thus, the proximal portion 25a flexes largely, so that the distal end portion 25b comes into linear contact with the lens molding surface 26b of the mold 26. In this respect, the second embodiment is more preferable. The height of the distal end portion 25b with respect to the height of the upper end of the proximal portion 25a is smaller than the height of the projecting band 5 of the gasket 2 shown in the first embodiment. This is suitable when obtaining sealing by bringing the lens molding surface 26b formed of the convex surface of the mold 26 into tight contact with the distal end portion 25b.

Figure 7A:
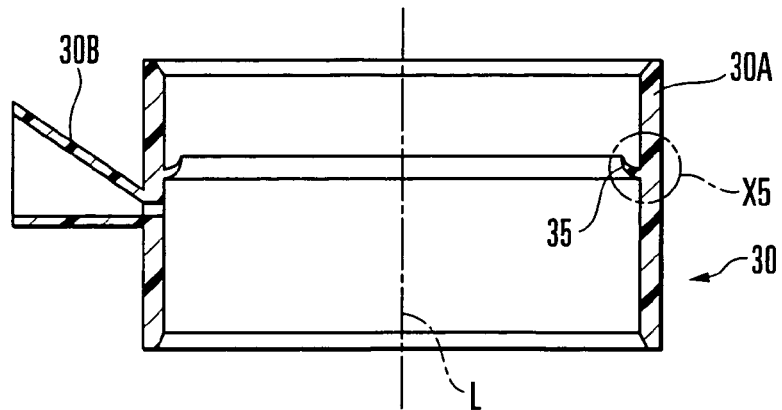
FIG. 7A is a sectional view of a gasket according to the third embodiment of the present invention.
Figure 7B:
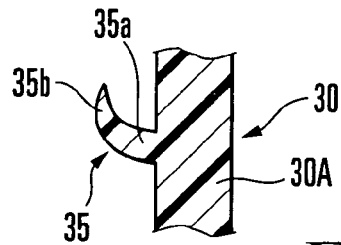
FIG. 7B is an enlarged view of a portion X5 of FIG. 7A.
Figure 8A:
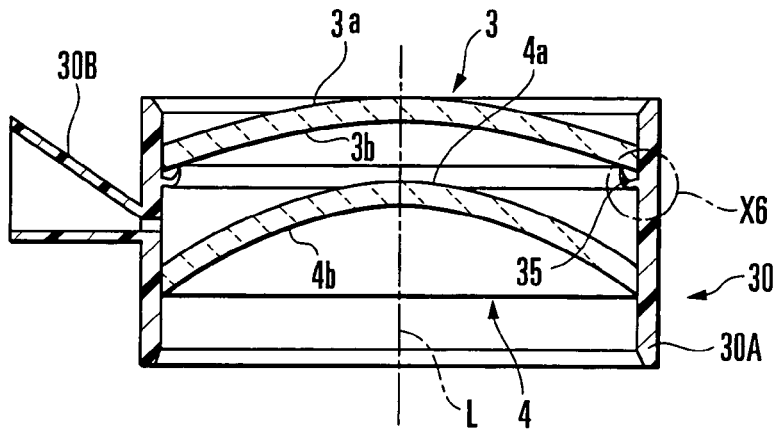
FIG. 8A is a sectional view showing a state wherein a mold is incorporated in the gasket according to the third embodiment.
Figure 8B:
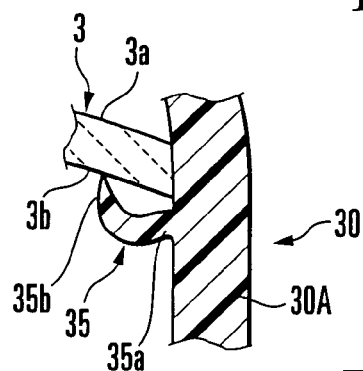
FIG. 8B is an enlarged view of a portion X6 of FIG. 8A.

FIG. 7A is a sectional view showing the third embodiment of the present invention, and FIG. 7B is an enlarged view of a portion X5 of FIG. 7A. FIG. 8A is a sectional view showing a state wherein a mold is incorporated in a gasket, and FIG. 8B is an enlarged view of a portion X6 of FIG. 8A. According to the third embodiment, a gasket 30 comprises a cylindrical gasket main body 30A, a filling port portion 30B which integrally projects on the outer circumferential surface of the gasket main body 30A, and an elastically deformable ring-like projecting band 35 which integrally projects on the inner circumferential surface of the gasket main body 30A throughout the entire circumference. The projecting band 35 inclines such that the nearer toward a distal end portion 35b from a proximal portion 35a, the closer the angle of the projecting band 35 becomes to that of the direction of an axis L of the gasket main body 30A. An upper surface 3a of a first mold 3 forms a convex surface, and its lower surface 3b forms a lens molding concave surface. An upper surface 4a of a second mold 4 forms a lens molding convex surface, and its lower surface 4b forms a concave surface 4b.

In this gasket 30, assume that the lens molding surface 3b of the first mold 3 is urged against the projecting band 35. The proximal portion 35a of the projecting band 35 inclines at a more moderate angle than the distal end portion 35b and flexes readily toward the axis L of the gasket main body 30A. Thus, flex of the distal end portion 35b side in the radial direction of the gasket main body 30A can be suppressed accordingly. Therefore, the distal end portion 35b comes into tight linear contact with the lens molding surface 3b, and the same effect as that of the first embodiment can be obtained.

Figure 9:
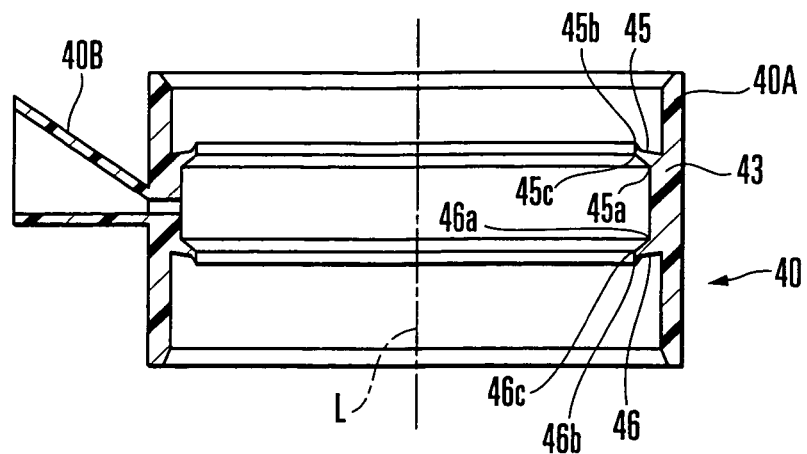
FIG. 9 is a sectional view of a gasket according to the fourth embodiment of the present invention.

FIG. 9 is a sectional view of a gasket according to the fourth embodiment of the present invention.

According to the fourth embodiment, a gasket 40 comprises a cylindrical gasket main body 40A, a filling port portion 40B which integrally projects on the outer circumferential surface of the gasket main body 40A, and a ring-like protruding band 43 which integrally projects on the inner circumferential surface of the gasket main body 40A throughout the entire circumference. Elastically deformable projecting bands 45 and 46 integrally project at the upper and lower ends of the protruding band 43 throughout the entire circumference. The upper projecting band 45 comprises a proximal portion 45a which inclines upward, and a distal end portion 45b which projects upward on the upper surface of the distal end portion of the proximal portion 45a and has a triangular section. The connecting portion of the proximal portion 45a and distal end portion 45b forms a bent portion 45c. The lower projecting band 46 comprises a proximal portion 46a which inclines downward, and a distal end portion 46b which integrally projects downward on the lower surface of the distal end portion of the proximal portion 46a and has a triangular section. The connecting portion of the proximal portion 46a and distal end portion 46b forms a bent portion 46c.

In the gasket 40, when the lens molding surface of the first mold which is pressed into the gasket 40 from above is urged against the distal end portion 45b of the upper projecting band 45, the proximal portion 45a elastically deforms downward, and the distal end portion 45b comes into tight linear contact with the lens molding surface of the first mold. When the lens molding surface of the second mold which is pressed into the gasket 40 from below is urged against the distal end portion 46b of the lower projecting band 46, the proximal portion 46a elastically deforms upward, and the distal end portion 46b comes into tight linear contact with the lens molding surface of the second mold.

In the gasket 40, as the projecting bands 45 and 46 integrally project, respectively, at the upper and lower ends of the protruding band 43, the lens molding surfaces of the pair of upper and lower molds can be respectively sealed by the projecting bands 45 and 46. In this embodiment, the presence of the protruding band 43 increases the strength of the intermediate portion in the direction of height of the gasket main body 40A and the strengths of the proximal portions 45a and 46a of the projecting bands 45 and 46. Alternatively, the protruding band 43 need not be provided, and the projecting bands 45 and 46 may directly project on the inner circumferential surface of the gasket main body 40A.

Figure 10A:
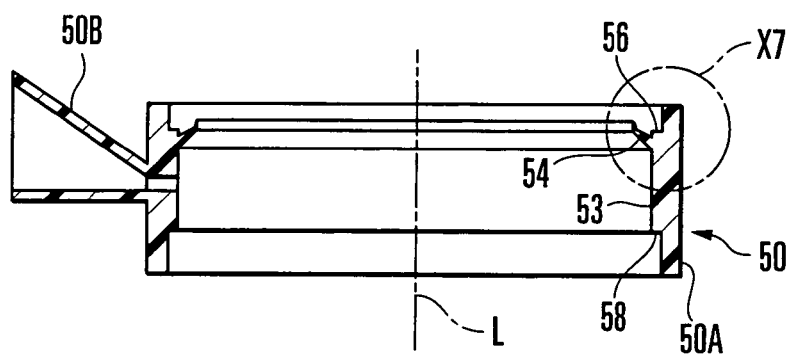
FIG. 10A is a sectional view of a gasket according to the fifth embodiment of the present invention.
Figure 10B:
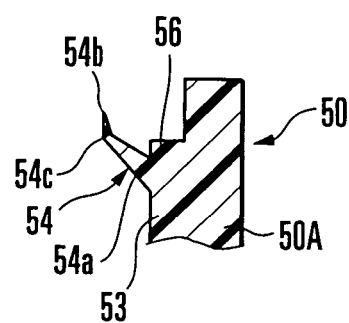
FIG. 10B is an enlarged view of a portion X7 of FIG. 10A.
Figure 11A:
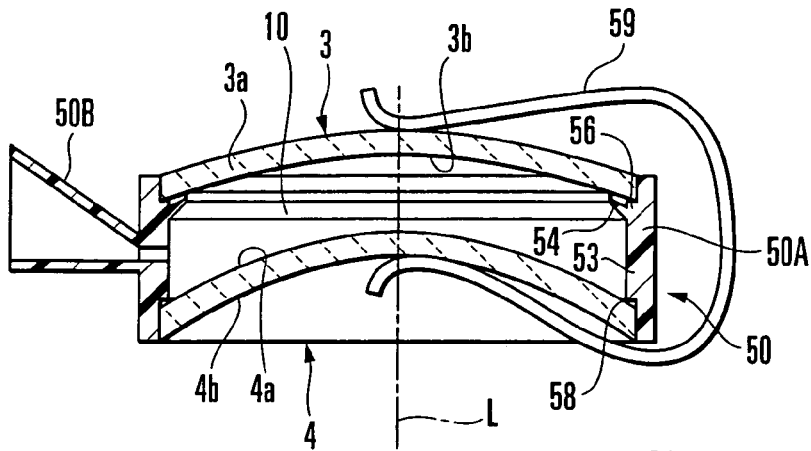
FIG. 11A is a sectional view showing a state wherein a mold is incorporated in the gasket according to the fifth embodiment.
Figure 11B:
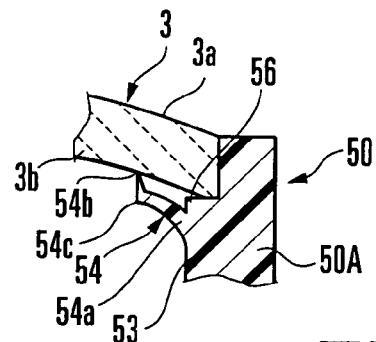
FIG. 11B is an enlarged view of the main part.

FIG. 10A is a sectional view of a gasket according to the fifth embodiment of the present invention, and FIG. 10B is an enlarged view of a portion X7 of FIG. 10A. FIG. 11A is a sectional view showing a state wherein a mold is incorporated in the gasket, and FIG. 11B is an enlarged view of the main part. A gasket 50 comprises a cylindrical gasket main body 50A, a filling port portion 50B which integrally projects on the outer circumferential surface of the gasket main body 50A, a ring-like protruding band 53 which integrally projects at the center in the direction of height of the inner circumferential surface of the gasket main body 50A throughout the entire circumference, and an elastically deformable protruding band 54 which integrally projects at the upper end portion of the protruding band 53 throughout the entire circumference. A proximal portion 54a of the projecting band 54 inclines obliquely upward. A distal end portion 54b of the projecting band 54 extends upward to be substantially parallel to the direction of an axis L of the gasket 50. The proximal portion 54a is connected to the distal end portion 54b in a bent manner at a bent portion 54c.

A positioning projection 56 is formed on the inner circumferential surface of the gasket main body 50A at a position higher than the base of the proximal portion 54a of the projecting band 54. The positioning projection 56 serves to come into contact with the peripheral portion on a lens molding surface 3b side of a first mold 3 which is to be incorporated, so as to determine the height of the mold in the direction of an axis L of the mold. The positioning projection 56 integrally projects on the inner circumferential surface of the gasket main body 50A throughout the entire circumference. However, the present invention is not limited to this, and a plurality of positioning projections may project at appropriate intervals in the circumferential direction. The lower surface of the protruding band 53 forms a positioning portion 58 which comes into contact with the peripheral portion on a lens molding surface 4a side of a second mold 4 to seal the peripheral portion, and positions the second mold 4.

An upper surface 3a of the first mold 3 forms a convex surface, and its lower surface 3b forms a lens molding concave surface. The upper surface 4a of the second mold 4 forms a lens molding convex surface, and its lower surface 4b forms a concave surface. The first and second molds 3 and 4 have outer diameters each of which is substantially equal to or smaller than the inner diameter of the gasket main body 50A. This is due to the following reason. The gasket according to this embodiment holds the molds 3 and 4 by clamping them inward from the two outer sides with an elastic fixing means 59. The inner circumferential surface of the gasket main body need not be brought into strong contact with the circumferential surface of the mold. If the inner diameter of the gasket main body is substantially equal to the outer diameter of the mold, it is preferable because the center of the mold can be aligned.

In the gasket 50, the first mold 3 is fitted in the gasket 50 from above with its lens molding surface 3b facing down, and is inserted until the peripheral portion of the lens molding surface 3b of the first mold 3 abuts against the positioning projection 56. The second mold 4 is fitted in the gasket 50 from below with its lens molding surface 4a facing up, and is inserted until the peripheral portion of the lens molding surface 4a abuts against the positioning portion 58. As the molds 3 and 4 are clamped by the elastic fixing means 59, they are held as they are urged against and positioned by the positioning projection 56 and positioning portion 58. Therefore, the molds 3 and 4 will not come out from the gasket 50. Regarding the fixing means 59, it is formed of a wire spring which is bent substantially in a U shape. The projecting band 54 is molded in advance to have such a shape that when the first mold 3 abuts against the positioning projection 56, the projecting band 54 is pressed by the lens molding surface 3b and flexes, so that the first mold 3 can seal with an appropriate pressure. When the first mold 3 is forced in and the peripheral portion of the lens molding surface abuts against the positioning projection 56, the distal end portion 54b of the projecting band 54 is pushed downward by the lens molding surface 3b, and the proximal portion 54a side flexes toward the axis L, so the distal end portion 54b comes into tight linear contact with the lens molding surface 3b.

In the gasket 50, as the distal end portion 54b of the projecting band 54 comes into tight linear contact with the lens molding surface 3b of the first mold 3, the same effect as that of the first embodiment shown in FIG. 1A can be obtained. As the gasket 50 comprises the positioning projection 56, the height of the mold 3 can be accurately determined.

As in this embodiment, when the elastic fixing means 59 is to hold the molds 3 and 4 by clamping them externally, the fixing means 59 constantly applies a predetermined pressure to the molds 3 and 4 inward in the direction of the axis L of the gasket 50. If the positioning projection 56 is provided, the projecting band 54 can be prevented from being excessively forced in by the molds 3 and 4. As the edge portion of the mold 3 does not directly abut against the proximal portion 54a side of the projecting band 54, deformation and damage of the projecting band 54 can be prevented. The positioning projection 56 can also be applied to the gasket 2, 20, or 30 which holds the mold by clamping the circumferential surface of the mold with the inner circumferential surface of the gasket main body as shown in FIG. 3A, 5A, or 7A.

Figure 12:
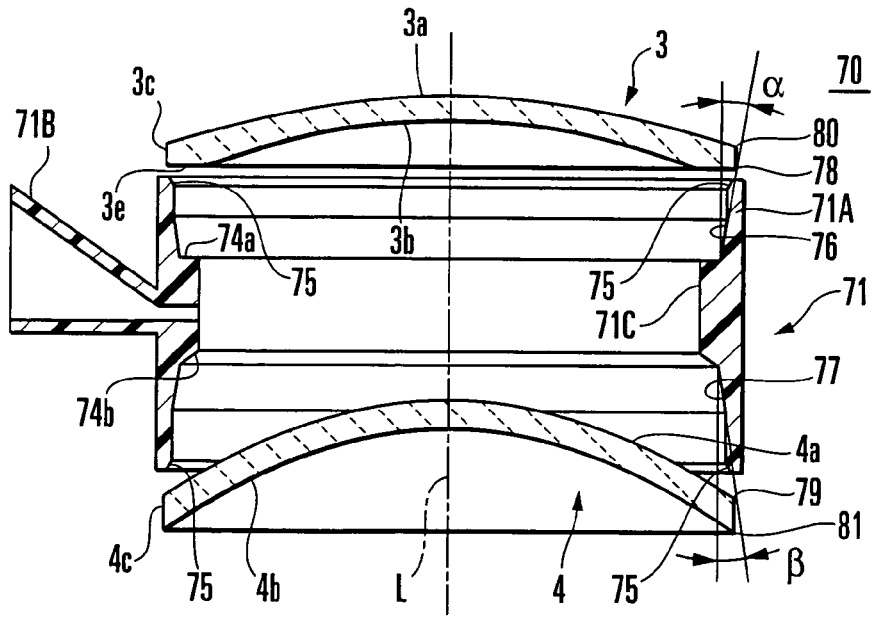
FIG. 12 is a sectional view before assembly to show a gasket for molding a plastic lens according to the sixth embodiment of the present invention.
Figure 13A:
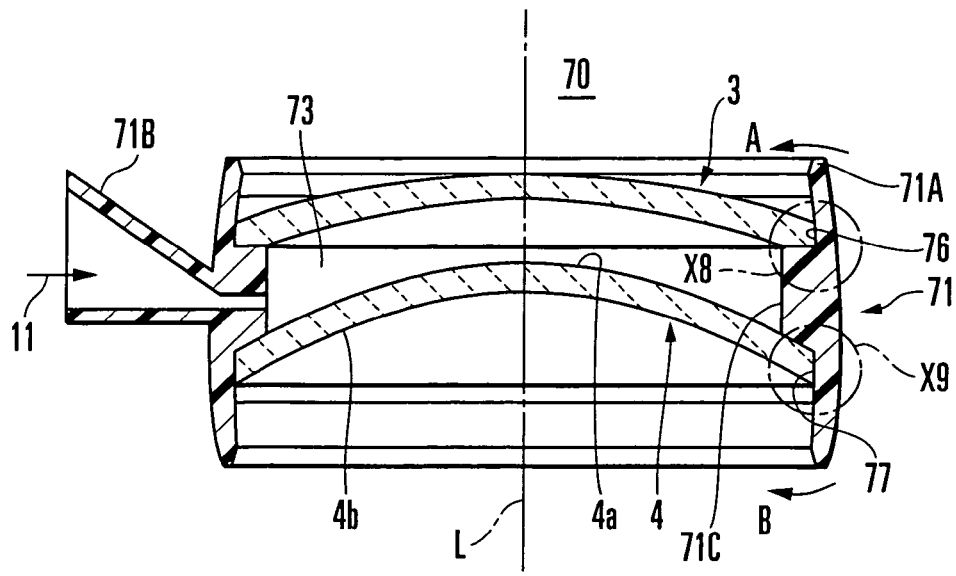
FIG. 13A is a sectional view showing a state wherein molds are incorporated in the gasket.
Figure 13B:
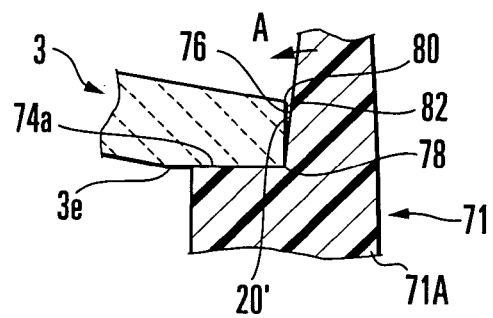
FIGS. 13B and 13C are enlarged views of portions X8 and X9, respectively, of FIG. 13A.
Figure 13C:
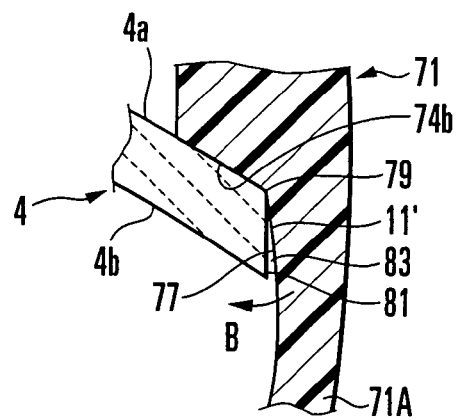
Figure 14:
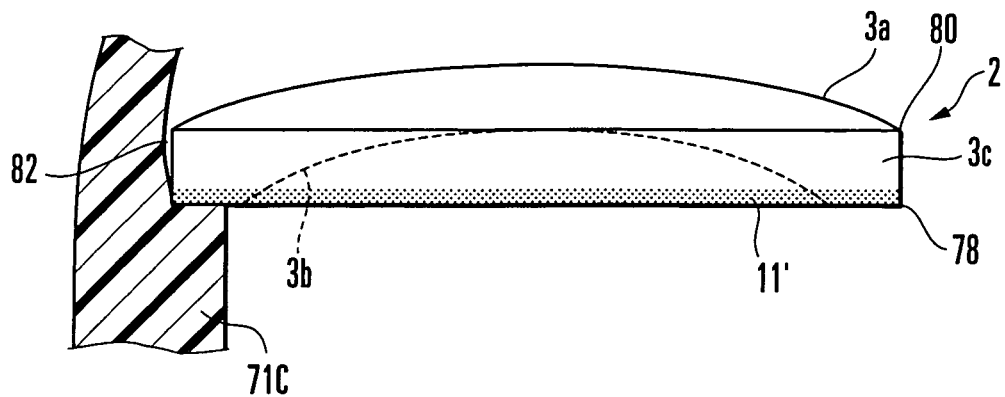
FIG. 14 is a view showing a leakage monomer which leaks into a gap due to capillarity.

FIG. 12 is a sectional view of a gasket according to the sixth embodiment of the present invention before assembling molds. FIG. 13A is a sectional view showing a state wherein the molds are incorporated in the gasket, and FIGS. 13B and 13C are enlarged views of portions X8 and X9, respectively, of FIG. 13A. FIG. 14 is a view showing a leakage monomer which leaks into a gap due to capillarity. Referring to FIGS. 12 to 14, a mold for molding a plastic lens denoted by reference numeral 70 comprises a cylindrical gasket 71 and a pair of molds (to be also referred to as first and second molds hereinafter) 3 and 4 which are to be pressed into the gasket 71.

The gasket 71 which is formed by injection molding of a synthetic resin and comprises a cylindrical gasket main body 71A which has two open ends, a filling port portion 71B which integrally projects at the central portion in the direction of height of the outer circumferential surface of the gasket main body 71A, and a ring-like positioning projecting ridge 71C which integrally projects at the central portion of the inner circumferential surface of the gasket main body 71A throughout the entire circumference. The positioning projecting ridge 7 is not particularly limited in shape as far as it projects inward to be able to position the molds 3 and 4 in the direction of an axis L of the gasket main body 71A, and is preferable if no excessive air remains in a cavity 73 formed between the gasket main body 71A and the pair of molds 3 and 4 when filling a monomer 11. According to this embodiment, the peripheral portion of a lens molding surface 3b of the first mold 3 forms a surface 3e that is perpendicular to the central axis of the mold 3. Thus, an upper surface 74a of the positioning projecting ridge 71C forms a flat surface that is substantially perpendicular to the axis L of the gasket main body 71A, so the surface 3e on the peripheral portion of the lens molding surface 3b comes into tight contact with the upper surface 74a with no gap. Similarly, a lower surface 74b of the positioning projecting ridge 71C forms a taper surface that conforms to the inclination of the peripheral portion of a lens molding surface 4a of the second mold 4, so the lens molding surface 4a comes into tight contact with the lower surface 74b with no gap. Taper surfaces 75 which spread outward to facilitate insertion of the molds 3 and 4 are respectively formed on the two end openings of the gasket main body 71A.

Taper surfaces 76 and 77 are formed on those portions of the inner circumferential surface of the gasket main body 71A with which circumferential surfaces 3c and 4c of the first and second molds 3 and 4 respectively come into contact. The upper taper surface 76 forms a taper surface that spreads toward the upper opening of the gasket 71, and the lower taper surface 77 forms a taper surface that spreads toward the lower opening of the gasket 71. Of the taper surfaces 76 and 77, those portions which oppose the circumferential surfaces 3c and 4c of the molds 3 and 4 have inner diameters that are smaller than the outer diameters of the molds 3 and 4 to be incorporated. Of the taper surfaces 76 and 77, only those inner portions which oppose the circumferential surfaces 3c and 4c of the molds 3 and 4 may have inner diameters that are smaller than the outer diameters of the molds 3 and 4.

As the taper surfaces 76 and 77 are formed on the inner circumferential surface of the gasket main body 71A, they are urged by the circumferential surfaces 3c and 4c of the molds 3 and 4, when the molds 3 and 4 are pressed into the gasket 71, and elastically deform in the diameter-increasing direction. The more inward toward the axis L of the gasket main body 71A, the smaller the inner diameters of the taper surfaces 76 and 77. Thus, circumferential edges 78 and 79 (to be also referred to as inner-side circumferential edges hereinafter) of the circumferential surfaces 3c and 4c of the molds 3 and 4 on the sides of the lens molding surfaces 3b and 4a can be brought into stronger contact with the taper surfaces 76 and 77 than circumferential edges 80 and 81 (to be also referred to as outer-side circumferential edges hereinafter) on the opposite sides to the lens molding surfaces 3b and 4a. As a result, as shown in FIG. 13B, a V-shaped gap 82 is formed between the taper surface 76 of the gasket 71 and the circumferential surface 3c of the first mold 3. Also, as shown in FIG. 13C, an inverted-V-shaped gap 83 is formed between the taper surface 77 of the gasket 71 and the circumferential surface 4c of the second mold 4. The contact state of the circumferential surfaces 3c and 4c of the molds 3 and 4 with the taper surfaces 76 and 77 is not limited to the contact state that forms the V-shaped gaps 82 and 83. For example, the circumferential surfaces 3c and 4c of the molds 3 and 4 are in contact with the respective taper surfaces 76 and 77 throughout their entire widths. However, the inner-side circumferential edges 78 and 79 may be in strongest contact, and the nearer toward the outer-side circumferential edges 80 and 81, the lower the contact pressure may be. The upper and lower ends in the axial direction of the circumferential surfaces 3c and 4c of the molds 3 and 4 may be respectively in tight contact with the taper surfaces 76 and 77. The intermediate portions between the upper and lower ends of the circumferential surfaces 3c and 4c of the molds 3 and 4 may be in weaker contact than the upper and lower ends, or form the gaps 82 and 83, and the inner-side circumferential edges 78 and 79 may be in stronger contact than the outer-side circumferential edges 80 and 81. Also, the contact states described above may mix in the circumferential direction. According to the present invention, in any one of these cases, the inner-side circumferential edges 78 and 79 can come in the strongest contact with the taper surfaces 76 and 77.

Angles $\alpha$ and $\beta$ of inclination of the taper surfaces 76 and 77 with respect to the axis L of the gasket main body 71A must be set such that when the mold 70 is assembled, the inner-side circumferential edges 78 and 79 of the circumferential surfaces 3c and 4c of the molds 3 and 4 come into stronger contact with the inner circumferential surface of the gasket 71 than the outer-side circumferential edges 80 and 81. The preferable angles $\alpha$ and $\beta$ of inclination change depending on the thickness, height, and inner diameter of the gasket 71, the lengths of the taper surfaces 76 and 77, the respective sizes of the molds 3 and 4 such as outer diameters and holding positions, the hardness and elongation characteristics of the material of the gasket 71, and the like. In general, if the elastic deformation amount in the diameter-increasing direction of the gasket 71 is large when the molds 3 and 4 are pressed into the gasket 71, large angles are required. If the deformation amount is small, small angles are set. A deformation amount that is preferable in manufacturing a highly accurate lens with good reproducibility by polymerization of the monomer 11 falls within a predetermined range. Inevitably, a preferable range exists for the angles of the taper surfaces 76 and 77. The preferable range of the angles $\alpha$ and $\beta$ of inclination is 0.5° to 15°, and more preferably 1° to 10°. If the angles $\alpha$ and $\beta$ of inclination are set to 0.5° or more, even when the circumferential surfaces 3c and 4c of the molds 3 and 4 are respectively brought into strong contact with the taper surfaces 76 and 77, the difference in contact pressure between the taper surface 76 and the inner- and outer-side circumferential edges 78 and 80 increases, and the difference in contact pressure between the taper surface 77 and the inner- and outer-side circumferential edges 79 and 81 increases. The inner-side circumferential edges 78 and 79 can be respectively brought into contact with the taper surfaces 76 and 77 more strongly and reliably. Hence, good sealing can be ensured. If the angles $\alpha$ and $\beta$ of inclination are set to 15° or less, even when the deformation amounts of the taper surfaces 76 and 77 are small, the molds 3 and 4 will not be pushed out in directions opposite to their inserting directions. The molds 3 and 4 can thus be positioned more stably and held well.

The angles $\alpha$ and $\beta$ of inclination of the taper surfaces 76 and 77 may be such that they form approximate taper surfaces (e.g., convex or concave curved surfaces that change moderately) which change stepwise or continuously. When referring to these surfaces generically, they will be called taper surfaces.

The heights (heights in the axial direction of the gasket main body) of the taper surfaces 76 and 77 are preferably designed such that when the molds 3 and 4 are incorporated, ½ or more from inside of those portions of the inner circumferential surface of the gasket 71 which correspond to (oppose) the circumferential surfaces 3c and 4c of the molds 3 and 4 form taper surfaces. When the heights of the taper surfaces 76 and 77 which oppose the circumferential surfaces 3c and 4c of the molds 3 and 4 are ½ or more the edge thicknesses of the molds 3 and 4, respectively, the inner-side circumferential edges 78 and 79 of the molds 3 and 4 can be brought into strong contact with the taper surfaces 76 and 77, respectively, and the molds 3 and 4 can be held well.

As the material of the gasket 71, a material with elasticity which is necessary in bringing the circumferential surfaces 3c and 4c of the molds 3 and 4 into tight contact with the inner circumferential surface of the gasket 71, thus achieving sealing, is selected. A monomer (e.g., a diethylene glycol bisallyl carbonate-based resin or polyurethane-based resin) for a general spectacle lens has a high polymerizing shrinkage factor of about 7% to 15%. Thus, a material with flexibility or pliability (elasticity) is selected, so that when the monomer 11 is filled in the mold 70 for molding the plastic lens and polymerizes, the molds 3 and 4 can move to follow the polymerizing shrinkage. Generally, a thermoplastic material such as a polyethylene-based resin, e.g., an ethylene-vinyl acetate copolymer or ethylene-propylene copolymer, is used. A particularly preferable material is an ultralow-density polyethylene resin which is used in this embodiment.

The molds 3 and 4 are formed into menisci. The circumferential surface 3c of the first mold 3 forms a cylindrical surface substantially parallel to the axis. One surface of the first mold 3 which exposes outside the gasket 71 forms a moderately curved convex surface 3a, and its other surface on the inner side also forms the moderately curved concave surface 3b. The convex surface 3a is a surface that is not used as a lens molding surface, and accordingly forms an arbitrary finished surface. The concave surface 3b forms a transfer surface (lens molding surface) for the convex surface side of the plastic lens that is to be molded. Thus, the lens molding surface 3b is planished with a predetermined curvature. The peripheral portion of the lens molding surface 3b forms the ring-like flange surface 3e which is perpendicular to the axis of the mold 3.

Similarly, the circumferential surface 4c of the second mold 4 forms a cylindrical surface substantially parallel to the axis. One surface of the second mold 4 which is inside the gasket 71 forms a convex surface 4a, and its surface which is outside the gasket 71 forms a concave surface 4b. The convex surface 4a forms a transfer surface (lens molding surface) for the concave surface side of the plastic lens that is to be molded. Accordingly, the lens molding surface 4a is planished with a predetermined curvature. The concave surface 4b which is outside the gasket 71 is a surface that is not used as a lens molding surface, and accordingly forms an arbitrary finished surface.

When the molds 3 and 4 are pressed into the gasket 71, the gasket 71 elastically deforms at its central portion in the diameter-increasing direction, as shown in FIG. 13A, to form a barrel shape. The restoring force of the gasket 71 clamps the circumferential surfaces of the respective molds 3 and 4 to hold the molds 3 and 4. Thus, the holding state and the sealing state of the molds 3 and 4 are reinforced.

When the gasket 71 elastically deforms into the barrel shape, the upper taper surface 76 inclines in the direction of an arrow A in FIG. 13B to decrease the angle $\alpha$ of inclination. The circumferential edge 78 of the first mold 3 on the lens molding surface 3b side comes into stronger contact with the taper surface 76 than the circumferential edge (to be also referred to as the outer-side circumferential edge hereinafter) 80 of the surface 3a which is on the opposite side to the lens molding surface 3b side. Therefore, the V-shaped gap 82 which opens upward is formed between the taper surface 76 and the circumferential surface 3c of the first mold 3.

When the second mold 4 is pressed into the gasket 71, the gasket 71 elastically deforms in the diameter-increasing direction, and the lower taper surface 77 inclines in the direction of an arrow B in FIG. 13C to decrease the angle $\beta$ of inclination. The circumferential edge 79 of the second mold 4 on the lens molding surface 4a side comes into stronger contact with the taper surface 77 than the circumferential edge (to be also referred to as the outer-side circumferential edge hereinafter) 81 of the surface 4b which is on the opposite side to the lens molding surface 4a side. Therefore, the triangular (inverted-V-shaped) gap 41 which opens downward is formed between the taper surface 77 and the circumferential surface 4c of the second mold 4.

With the molds 3 and 4 being incorporated in the gasket 71 in this manner, when the monomer 11 is filled into the cavity 73 from the filling port portion 71B, part of the monomer 11 flows through the gaps between the positioning projecting ridge 71C and the first and second molds 3 and 4 by capillarity to reach the gaps between the circumferential surfaces 3c and 4c of the molds 3 and 4 and the taper surfaces 76 and 77 of the gasket 71. The contact portions of the inner-side circumferential edges 78 and 79 with the taper surfaces 76 and 77 of the gasket 71 provide the strongest contact. The nearer the opening side of the gasket 71, the larger the gaps 82 and 83 are. Thus, a leakage monomer 11' (see FIG. 14) gathers near the inner-side circumferential edges 78 and 79 and stabilizes. Thus, portions near the inner-side circumferential edges 78 and 79 are firmly sealed by the leakage monomer 11' throughout the entire circumference. Even if the pressure in the cavity 73 becomes negative along with the polymerizing shrinkage of the monomer 11, air drawing from outside the molding mold 70 can be prevented, and a bubble defect can be prevented. As described above, the taper surfaces 76 and 77 of the gasket 71 may be respectively in contact with the circumferential surfaces 3c and 4c of the molds 3 and 4 in different manners. In any contact state, the inner-side circumferential edges 78 and 79 are in the strongest contact with the taper surfaces 76 and 77. Thus, strong sealing is obtained in the same manner as the cases described above.

Figure 15:
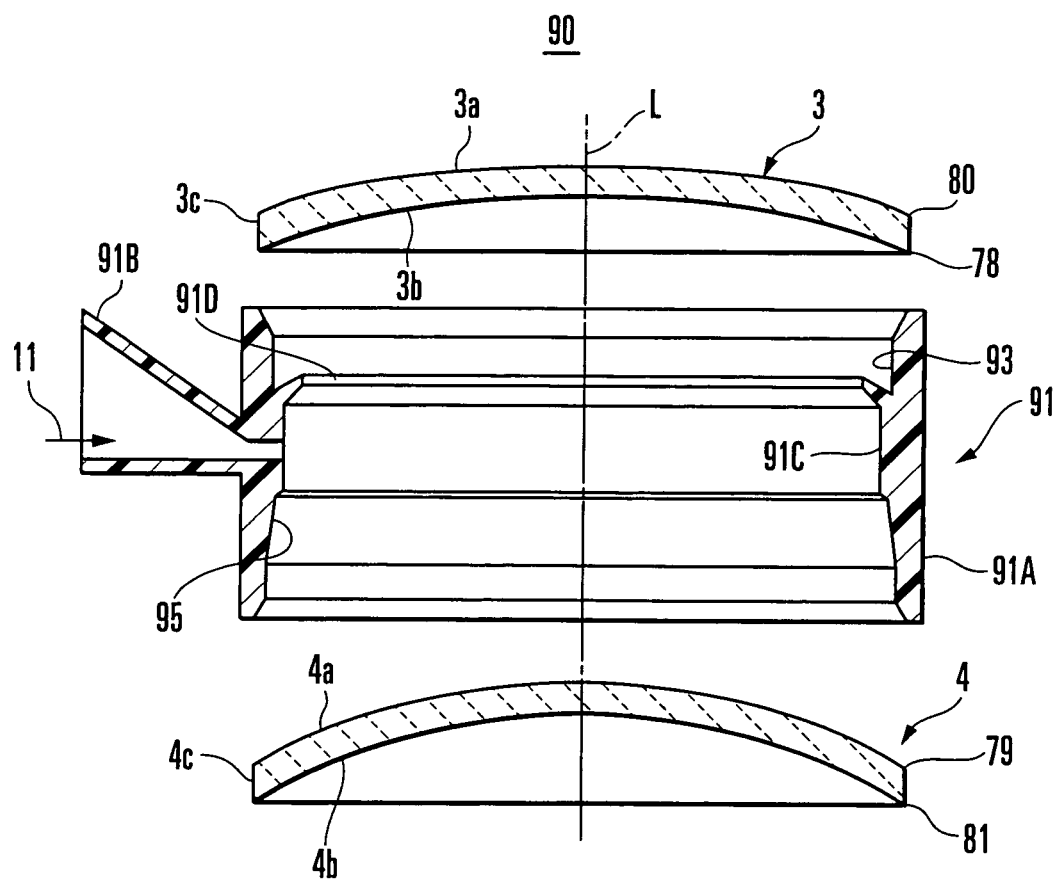
FIG. 15 is a sectional view before assembly to show the seventh embodiment of the present invention.
Figure 16:
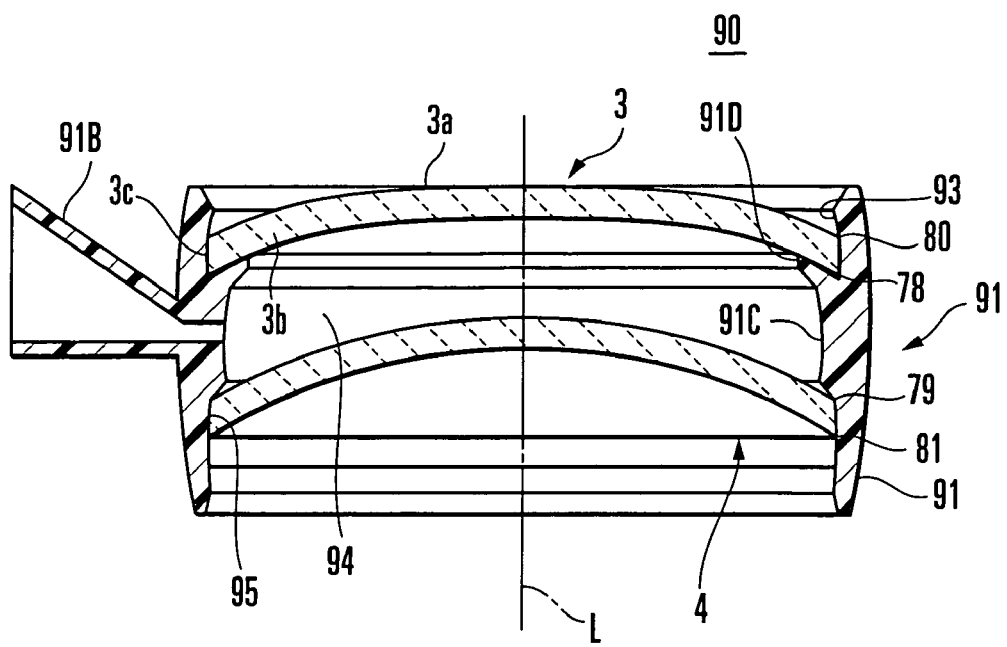
FIG. 16 is a sectional view after assembly.

FIG. 15 is a sectional view before assembly to show the seventh embodiment of the present invention, and FIG. 16 is a sectional view after assembly. The seventh embodiment shows a case in which, of two molds 3 and 4, only the upper mold 3 is sealed by a gasket according to the present invention. A mold denoted by reference numeral 90 for molding a plastic lens comprises a cylindrical gasket 91 and the pair of molds (to be also referred to as the first and second molds hereinafter) 3 and 4 which are to be pressed into the gasket 91.

The gasket 91 which is formed by injection molding of a synthetic resin and comprises a cylindrical gasket main body 91A which has two open ends, a filling port portion 91B which integrally projects at the central portion in the direction of height of the outer circumferential surface of the gasket main body 91A, a ring-like positioning projecting ridge 91C which integrally projects at the central portion of the inner circumferential surface of the gasket main body 91A throughout the entire circumference, and a ring-like seal portion 91D which integrally projects on the upper corner portion of the positioning projecting ridge 91C throughout the entire circumference. The seal portion 91D forms an elastically deformable pointed fin which is directed upward and has a tapered section.

When the first mold 3 is fitted into the gasket main body 91A, that portion of a lens molding surface 3b which is close to the outer peripheral portion is urged against the distal end portion of the seal portion 91D. That portion 93 of the inner circumferential surface of the gasket main body 91A where the first mold 3 is to be fitted and inserted forms a cylindrical surface having an inner diameter smaller than the outer diameter of the first mold 3. When the first mold 3 is inserted in the portion 93, the portion 93 elastically deforms in the diameter-increasing direction, and holds the first mold 3 with its restoring force. As has been described regarding the prior art, when the molds 3 and 4 are incorporated in the gasket main body 91A and the gasket main body 91A deforms into a barrel shape, a gap readily forms between a circumferential edge 78 of a circumferential surface 3c of the first mold 3 on the lens molding surface 3b side and the inner circumferential surface of the gasket main body 91A. As the distal end portion of the seal portion 91D is in tight contact with the lens molding surface 3b of the first mold 3 throughout the entire circumference, no problems occur in sealing.

That portion 95 of the inner circumferential surface of the gasket main body 91A into which the second mold 4 is to be pressed forms a taper surface which increases in diameter downward. Substantially except for this, the structure is the same as that of the sixth embodiment shown in FIG. 12.

With this gasket 91 as well, the contact surface of the gasket 91 and second mold 4 can be sealed well in the same manner as in the sixth embodiment described above. Thus, it is obvious that leakage of a monomer 11 and a bubble defect can be prevented.

Figure 17:
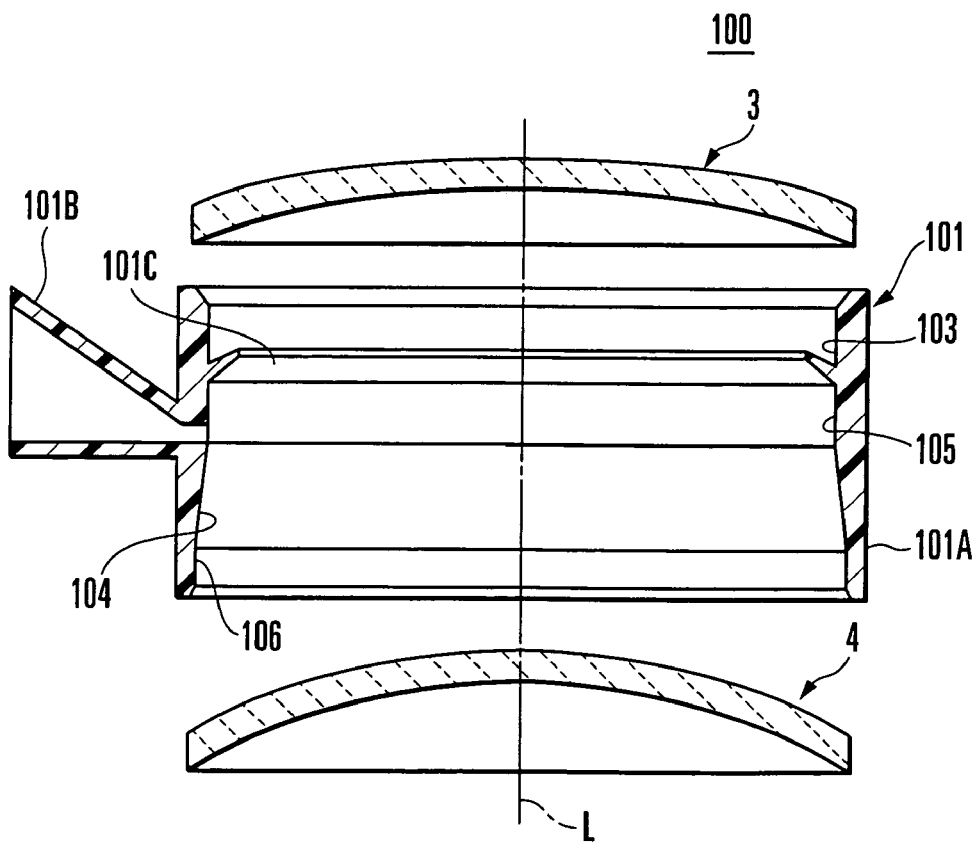
FIG. 17 is a sectional view before assembly to show the eighth embodiment of the present invention.

FIG. 17 is a sectional view before assembly to show the eighth embodiment of the present invention.

The eighth embodiment shows a case wherein the positioning projecting ridge 91C shown in FIGS. 15 and 16 is omitted, and the present invention is applied to a molding mold for manufacturing a semifinished lens blank (a lens only the convex surface of which is optically finished). A mold 100 for molding a plastic lens comprises a cylindrical gasket 101 and a pair of molds (to be also referred to as first and second molds hereinafter) 3 and 4 which are to be pressed into the gasket 101.

The gasket 101 comprises a cylindrical gasket main body 101A, a filling port portion 101B which integrally projects at the central portion in the direction of height of the outer circumferential surface of the gasket main body 101A, and a ring-like seal portion 101C which integrally projects at the intermediate portion of the inner circumferential surface of the gasket main body 101A throughout the entire circumference. That portion 103 of the inner circumferential surface of the gasket main body 101A where the first mold 3 is to be fitted and inserted forms a cylindrical surface having an inner diameter smaller than the outer diameter of the first mold 3. When the first mold 3 is inserted in the portion 103, the portion 103 elastically deforms in the diameter-increasing direction, and holds the first mold 3 with its restoring force. That portion 104 of the inner circumferential surface of the gasket main body 101A where the second mold 4 is to be fitted forms a taper surface which enlarges downward in diameter. The upper end of the portion 104 is connected to a cylindrical surface 105. The portion 103 where the first mold 3 is to be fitted, and the cylindrical surface 105 have the same inner diameter. That portion 106 of the gasket main body 101A which is under the taper surface 104 has an inner diameter that is larger than the inner diameter of the portion 103 where the first mold 3 is to be fitted. The seal portion 101C forms an elastically deformable pointed fin having a tapered section, and is directed obliquely upward. The seal portion 101C directly projects on that portion 103 of the inner circumferential surface of the gasket main body 101A where the first mold 3 is to be incorporated. Thus, the gasket 101 is different from the gasket 91 in that it does not comprise the positioning projecting ridge 91C of the gasket 91 shown in FIG. 16. Substantially except for this, the structure of the gasket 101 is substantially the same as that of the gasket 91. When the gasket has no positioning arrangement in this manner, the mold is forced into a predetermined position and held there by pressing it with a predetermined pressure or by a predetermined distance.

It is obvious that the same effect as that of the seventh embodiment described above can be obtained with the gasket 101 having the above structure.

Figure 18:
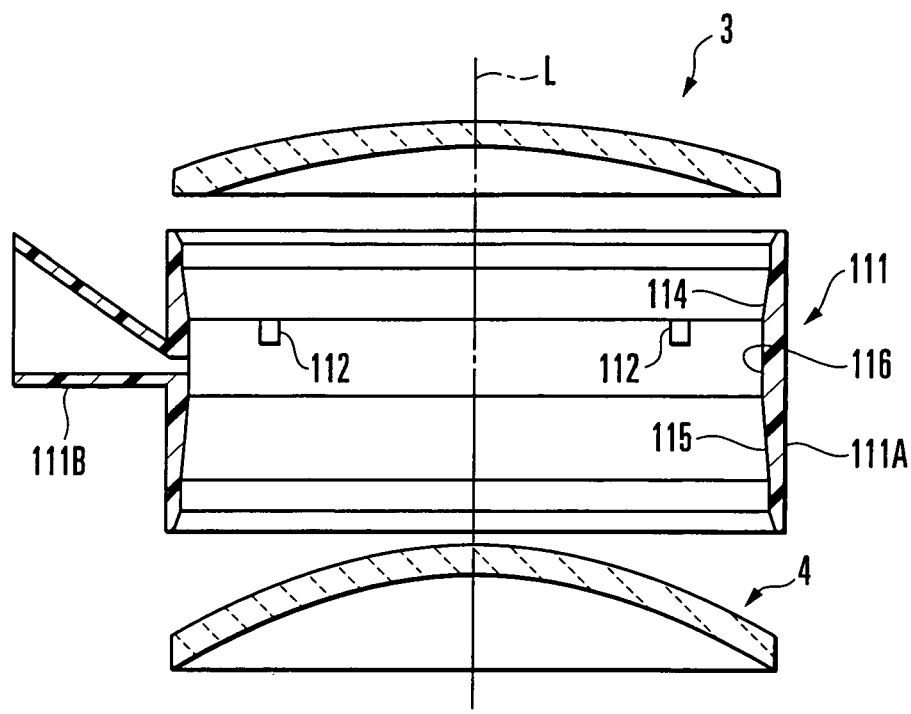
FIG. 18 is a sectional view before assembly to show the ninth embodiment of the present invention.
Figure 19:
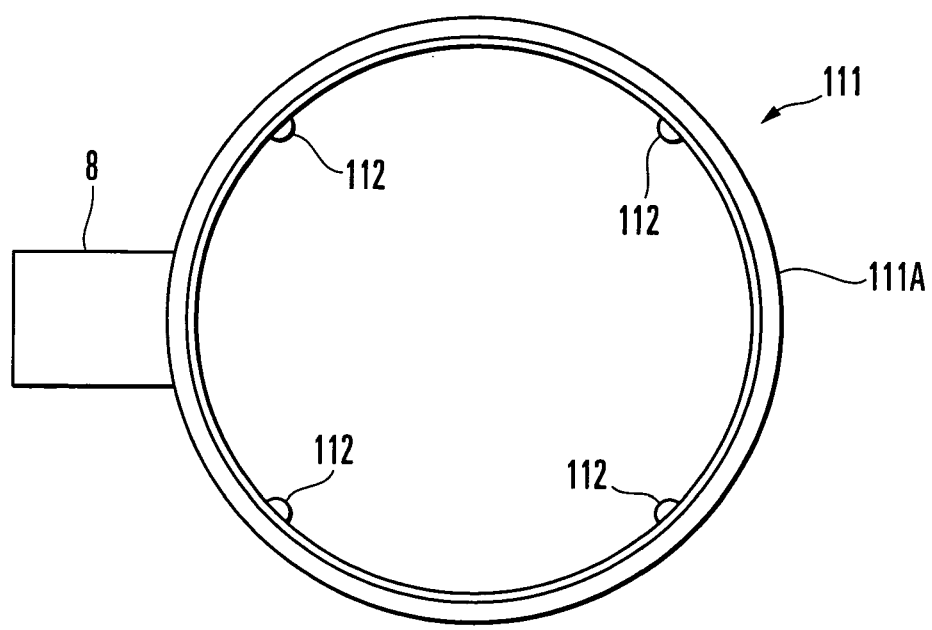
FIG. 19 is a plan view of a gasket.

FIG. 18 is a sectional view before assembly to show the ninth embodiment of the present invention, and FIG. 19 is a plan view of a gasket. The ninth embodiment shows a case wherein positioning projections 112 which position a first mold 3 are formed on the inner circumferential surface of a gasket 111, and the ring-like positioning projecting ridge 71C shown in FIG. 12 is eliminated.

The gasket 111 into which a pair of the mold 3 and a mold 4 are to be pressed comprises a cylindrical gasket main body 11A, a filling port portion 111B which integrally projects at the central portion in the direction of height of the outer circumferential surface of the gasket main body 111A, and the plurality of positioning projections 112 which integrally project at the intermediate portion of the inner circumferential surface of the gasket main body 111A at predetermined intervals in the circumferential direction. That portion 114 of the inner circumferential surface of the gasket main body 111A where the first mold 3 is to be fitted forms a taper surface which increases in diameter upward. Similarly, that portion 115 of the inner circumferential surface of the gasket main body 111A where the second mold 4 is to be fitted forms a taper surface which increases in diameter downward. That portion 116 of the inner circumferential surface of the gasket main body 111A which is between the taper surface 114 and taper surface 115 forms a cylindrical surface.

The four positioning projections 112 integrally project on the inner circumferential surface of the gasket main body 111A at the upper end of the cylindrical surface 116 equidistantly in the circumferential direction. Each positioning projection 112 forms a semicircular cylinder having a central axis in the direction of an axis L of the gasket main body 111A. The first mold 3 is positioned as it is pressed into the gasket 111 and abuts against the upper surfaces of the positioning projections 112. Sealing between the first mold 3 and gasket 111 is the same as in the case of the sixth embodiment shown in FIG. 12. Sealing between the second mold 4 and gasket 111 is the same as in the eighth embodiment shown in FIG. 17.

With this structure as well, the gaps between the gasket 111 and the molds 3 and 4 can be sealed well.

Figure 20:
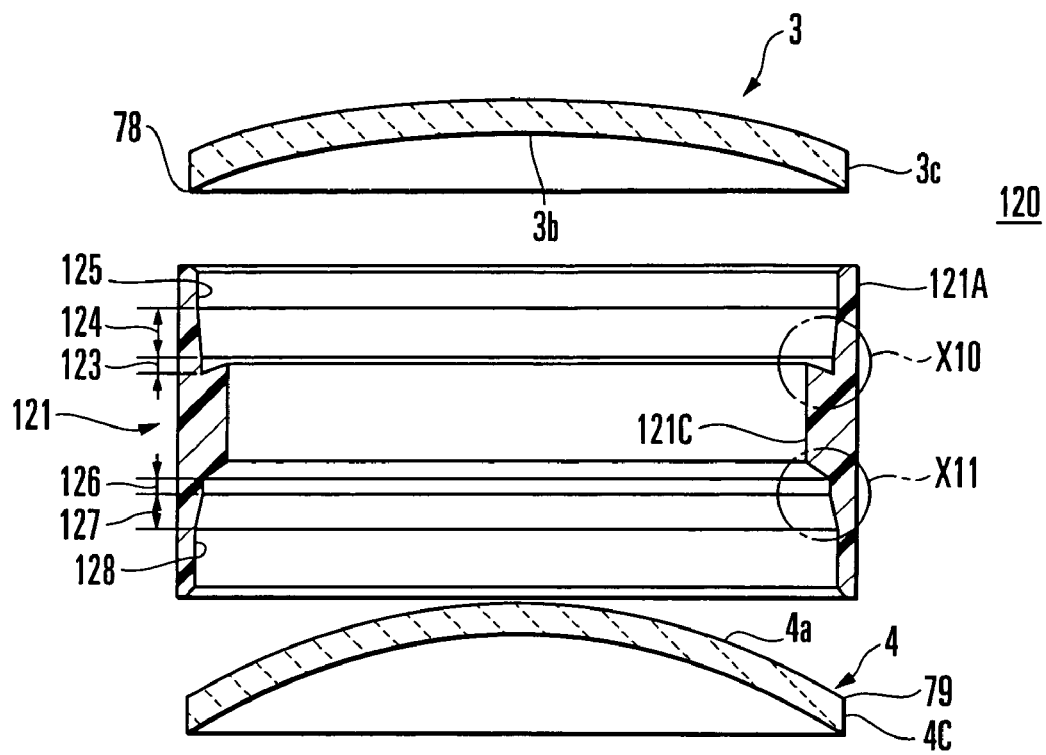
FIG. 20 is a sectional view before assembly to show the 10th embodiment of the present invention.
Figure 21:
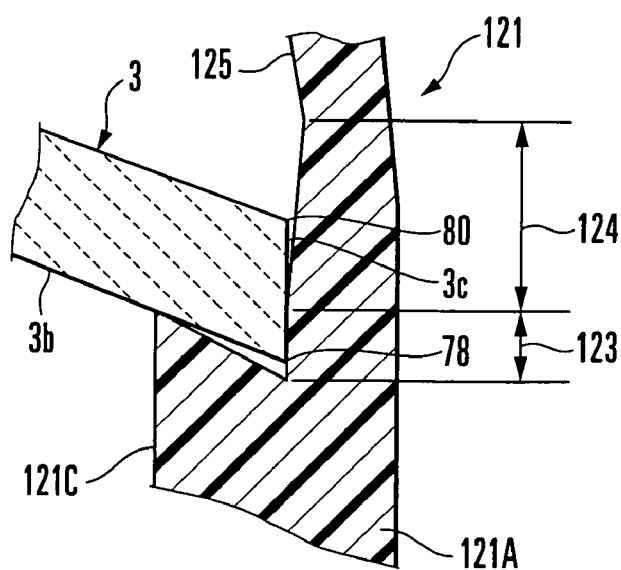
FIG. 21 is an enlarged view of a portion X10 of FIG. 20.
Figure 22:
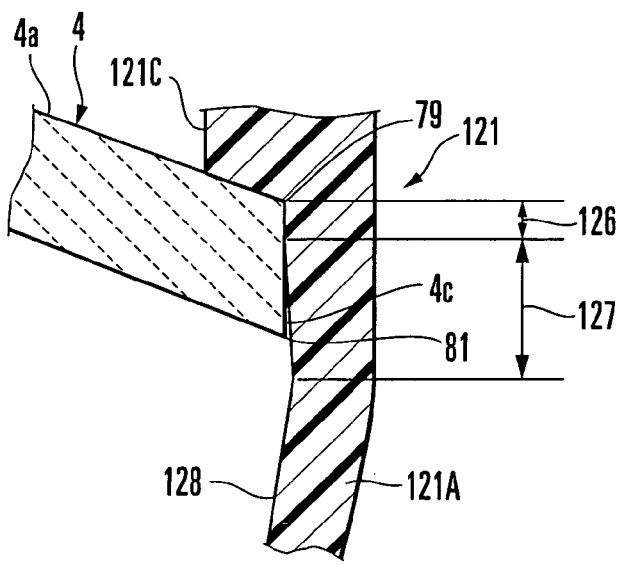
FIG. 22 is an enlarged view of a portion X11 of FIG. 20.

FIG. 20 is a sectional view before assembly to show the 10th embodiment of the present invention, FIG. 21 is an enlarged view of a portion X10 of FIG. 20, and FIG. 22 is an enlarged view of a portion X1 of FIG. 20.

A mold 120 for molding a plastic lens comprises a cylindrical gasket 121 and a pair of molds (to be also referred to as the first and second molds hereinafter) 3 and 4 which are to be pressed into the gasket 121.

The gasket 121 comprises a cylindrical gasket main body 121A, a filling port portion (not shown) which integrally projects at the central portion in the direction of height of the outer circumferential surface of the gasket main body 121A, and a ring-like positioning projecting ridge 121C which integrally projects at the center of the inner circumferential surface of the gasket main body 121A throughout the entire circumference. That portion of the inner circumferential surface of the gasket main body 121A which is above the positioning projecting ridge 121C comprises a small-diameter cylindrical portion (surface) 123, taper relief portion 124, and large-diameter cylindrical portion (surface) 125. Similarly, that portion of the inner circumferential surface of the gasket main body 121A which is under the positioning projecting ridge 121C comprises a small-diameter cylindrical portion (surface) 126, taper relief portion 127, and large-diameter cylindrical portion (surface) 128. The small-diameter cylindrical portions 123 and 126 are formed of cylindrical surfaces having inner diameters smaller than the outer diameters of the molds 3 and 4, respectively. The relief portions 124 and 127 are located on the outer sides (opening sides) in the axial direction of the gasket main body 121A of the small-diameter cylindrical portions 123 and 126, and form taper surfaces the inner diameters of which increase outward.

When the molds 3 and 4 are pressed into the gasket 121, circumferential edges 78 and 79 of circumferential surfaces 3$c$ and 4$c$ on the sides of lens molding surfaces 3$b$ and 4$a$ are brought into tight contact with the small-diameter cylindrical portions 123 and 126, respectively. The height of that portion the small-diameter cylindrical portion 123 of the gasket 121 which opposes the circumferential surface 3$c$ of the first mold 3 when the mold 3 is incorporated in the gasket is set to ½ or less the edge thickness of the first mold 3. Similarly, the height of that portion of the small-diameter cylindrical portion 126 of the gasket 121 which opposes the circumferential surface 4$c$ of the second mold 4 when the mold 4 is incorporated in the gasket is set to ½ or less the edge thickness of the second mold 4.

When the first and second molds 3 and 4 are pressed into the small-diameter cylindrical portions 123 and 126 of the gasket 121, the gasket 121 increases in diameter at its central portion to elastically deform into a barrel shape. As the inner diameters of the small-diameter cylindrical portions 123 and 126 are smaller than those of the relief portions 124 and 127, the small-diameter cylindrical portions 123 and 126 come into stronger contact with the circumferential surfaces 3$c$ and 4$c$ of the molds 3 and 4 than the relief portions 124 and 126 do. The heights of those portions of the small-diameter cylindrical portions 123 and 126 which oppose the circumferential surfaces 3$c$ and 4$c$ of the molds 3 and 4 are set to be smaller than ½ the edge thicknesses of the molds 3 and 4, respectively. Thus, the shape changes (angles of inclination) of the small-diameter cylindrical portions 123 and 126 when the molds 3 and 4 are pressed in are small (FIGS. 21 and 22). A portion near the circumferential edge 78 of the first mold 3 on the lens molding surface 3$b$ side and a portion near the circumferential edge 79 of the second mold 4 on the lens molding surface 4$a$ side respectively come into tight contact with the small-diameter cylindrical portions 123 and 126 with substantially equal contact pressures, thereby sealing the gasket 121. Thus, in this case, V-shape gaps do not readily form between the small-diameter cylindrical portions 123 and 126 and the molds 3 and 4. A large contact pressure per unit area can be obtained, so that the small-diameter cylindrical portions 123 and 126 can be sealed well. When a monomer is filled into the cavity, it enters between the inner circumferential surface of the gasket 121 and the circumferential surfaces 3$c$ and 4$c$ of the molds 3 and 4 to form a leakage monomer. The leakage monomer stably gathers at the small-diameter cylindrical portions 123 and 126 that provide strongest contact. As the heights of those portions of the small-diameter cylindrical portions 123 and 126 which oppose the circumferential surfaces 3$c$ and 4$c$ of the molds 3 and 4 are respectively ½ or less the edge thicknesses of the circumferential surfaces 3$c$ and 4$c$, the seal portions sealed by the leakage monomer become most stable inside the circumferential surfaces 3$c$ and 4$c$ of the molds 3 and 4. Thus, the circumferential surfaces 3$c$ and 4$c$ of the molds 3 and 4 and the inner circumferential surface of the gasket main body are sealed off in substantially the same state as with the leakage monomer 11' shown in FIG. 14. Therefore, monomer leakage and a bubble defect can be prevented by the same reason as that of the sixth embodiment shown in FIGS. 12 to 14. The lower the heights of those portions of the small-diameter cylindrical portions 123 and 126 with which the circumferential surfaces 3$c$ and 4$c$ of the molds 3 and 4 come into contact, the more the seal portions can be limited near the circumferential edges 78 and 79 on the lens molding surfaces 3$b$ and 4$c$ sides, which is preferable in sealing performance. More preferably, the heights are ⅓ or less the circumferential surfaces 3$c$ and 4$c$ of the molds 3 and 4. In this embodiment, as the relief portions 124 and 127 form taper surfaces, the small-diameter sides of the taper surfaces which are forced and enlarged by pressing in the molds 3 and 4 come into contact with the circumferential surfaces 3$c$ and 4$c$ of the molds 3 and 4 to hold the molds 3 and 4, which is more preferable. As the relief portions 124 and 127 form taper surfaces, the molds 3 and 4 can be readily fitted into the small-diameter cylindrical portions 123 and 126.

Figure 23:
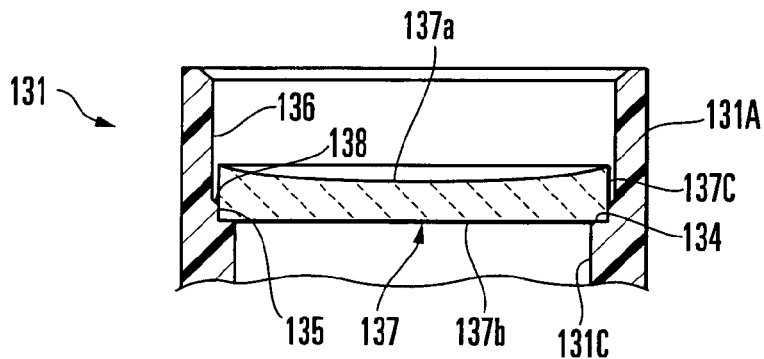
FIG. 23 is a sectional view of the main part of a gasket according to the 11th embodiment of the present invention.

FIG. 23 is a sectional view of the main part of a gasket according to the 11th embodiment of the present invention.

According to the 11th embodiment, a gasket main body 131A of a gasket 131 forms a cylinder. A positioning projecting ridge 131C integrally projects on the inner circumferential surface of the gasket main body 131A. An upper surface 134 of the positioning projecting ridge 131C forms a flat surface. That portion of the inner circumferential surface of the gasket main body 131A which is above the positioning projecting ridge 131C comprises a small-diameter cylindrical portion 135 and a relief portion 136. The small-diameter cylindrical portion 135 forms a cylindrical surface having an inner diameter smaller than the outer diameter of a mold 137. The relief portion 136 forms a cylindrical surface having an inner diameter larger than the inner diameter of the small-diameter cylindrical portion 135. The small-diameter cylindrical portion 135 is connected to the relief portion 136 through a step 138. An upper surface 137$a$ of the mold 137 forms a concave surface, and its lower surface 137$b$ forms a substantially flat lens molding surface. Substantially except for this, the structure is substantially the same as that of the 10th embodiment shown in FIG. 20.

In this gasket 131 as well, as the small-diameter cylindrical portion 135 is in strongest contact with a circumferential surface 137$c$ of the mold 137, good sealing can be obtained. If the step 138 between the small-diameter cylindrical portion 135 and relief portion 136 forms a taper surface that increases in diameter upward, the mold 137 can be readily fitted in the small-diameter cylindrical portion 135, which is advantageous.

Figure 24:
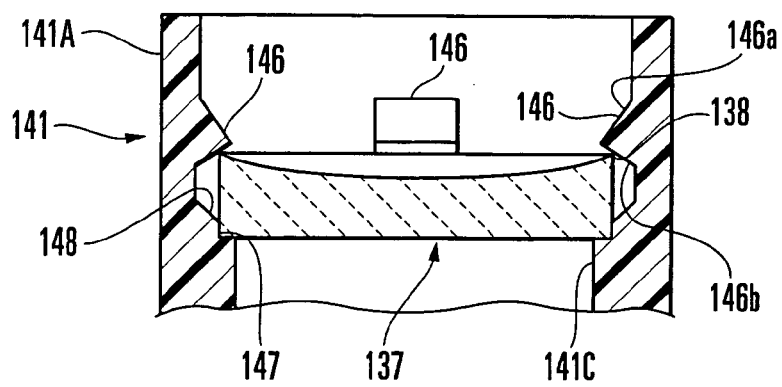
FIG. 24 is a sectional view of the main part of a gasket according to the 12th embodiment of the present invention.

If the width of the step 138 is set such that when the mold 137 is fitted in the gasket 131, the gasket 131 deforms into a barrel shape, and the inner circumferential surface of the relief portion 136 comes into contact with the outer-side circumferential edge of the circumferential surface 137$c$, it is preferable because the mold 137 will not come out readily. Although the relief portion 136 forms a cylindrical surface in this embodiment, the relief portion 136 can have any other shape as far as it spreads outward in the direction of diameter to be larger than the inner diameter of the small-diameter cylindrical portion 135:

FIG. 24 is a sectional view of the main part of a gasket according to the 12th embodiment of the present invention.

The 12th embodiment is a modification to the 11th embodiment shown in FIG. 23. A positioning projecting ridge 141C, and removal preventive portions 146 which prevent a mold 137 from coming out integrally project on the inner circumferential surface of a gasket main body 141A of a gasket 141. The upper surface of the positioning projecting ridge 141C forms a flat surface perpendicular to the axis of the gasket main body 141A. The plurality of removal preventive portions 146 are arranged above the positioning projecting ridge 141C at predetermined intervals. Each removal preventive portion 146 has a substantially triangular section, and its outside surface (upper surface) 146a forms a taper surface that inclines downward to facilitate insertion of the mold 137. An inside surface (lower surface) 146b of the removal preventive portion 146 forms a surface that presses an outer-side circumferential edge 138 of the mold 137 downward in the axial direction by its elastic force.

On the inner circumferential surface of the gasket main body 141A, a small-diameter cylindrical portion 147 and relief portion 148 are formed between the positioning projecting ridge 141C and removal preventive portions 136. The small-diameter cylindrical portion 147 forms a cylindrical surface having an inner diameter smaller than the outer diameter of the mold 137. The relief portion 148 forms a taper surface that increases in diameter upward. Substantially except for this, the structure is substantially the same as in the 11th embodiment shown in FIG. 23.

In the gasket 141 having the above structure, the height of the small-diameter cylindrical portion 147 is smaller than ½ the edge thickness of the first mold 137. Thus, although a holding force for the first mold 137 is small, the removal preventive portions 146 can reliably prevent the first mold 137 from readily coming out from the gasket 141. Similar removal preventive portions for the second mold can be provided to that portion of the inner circumferential surface of the gasket which is below the positioning projecting ridge 141C, so the second mold may be prevented from coming out from the gasket 141. The removal preventive portions for each of the first and second molds may form a ring-like portion which is continuously formed throughout the entire circumference of the inner circumferential surface of the gasket 141.

If the inner circumferential surfaces 146b of the removal preventive portions 146 incline at angles equal to 45° or more, when locking the mold 137 by engagement, the inner diameter of the inner circumferential surface of the gasket 141 will not be increased. Then, the sealing performance of the small-diameter cylindrical portion 147 is held well, which is more preferable.

Figure 25:
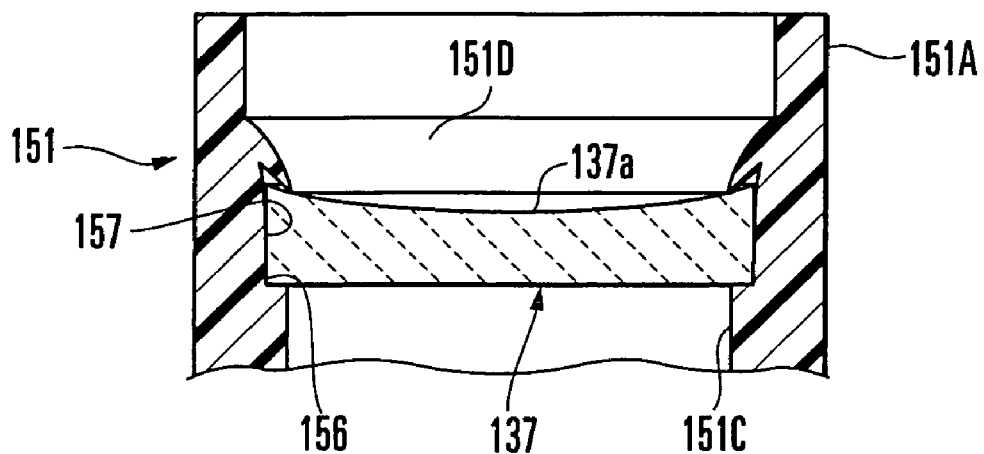
FIG. 25 is a sectional view of the main part of a gasket according to the 13th embodiment of the present invention.
Figure 26:
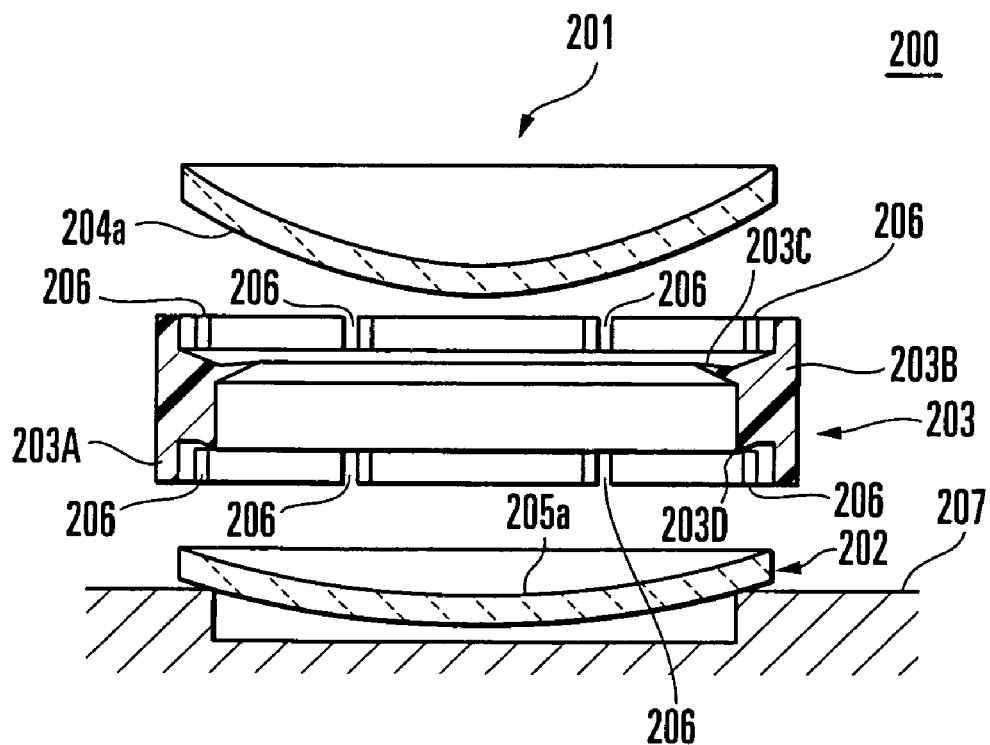
FIG. 26 is a sectional view before assembly to show a conventional mold for molding a plastic lens.
Figure 27A:
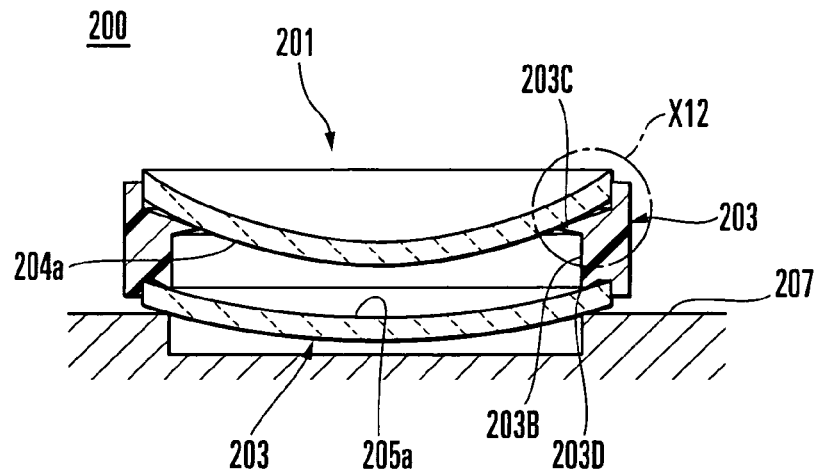
FIG. 27A is a sectional view after assembly.
Figure 27B:
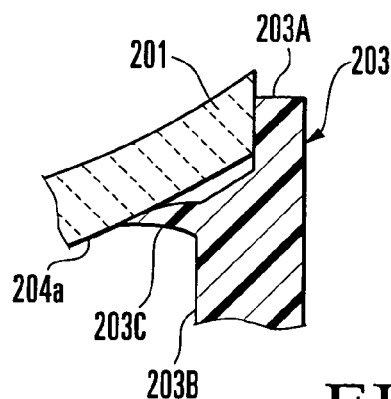
FIG. 27B is an enlarged view of a portion X12 of FIG. 17A.
Figure 28:
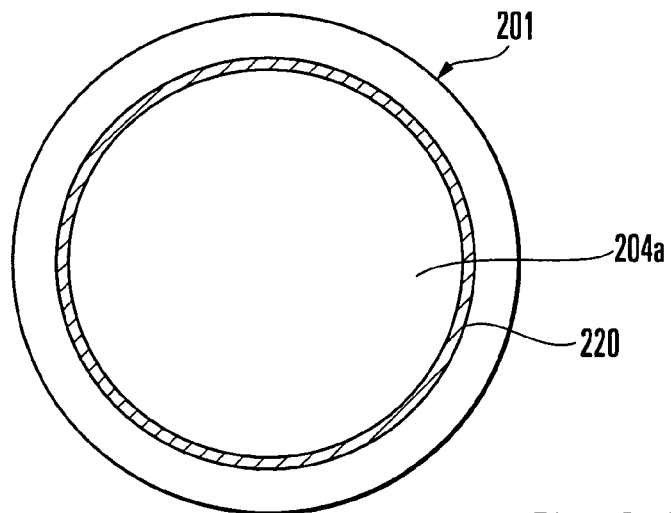
FIG. 28 is a front view of a mold seen from the lens molding surface side to show the state of resin tailings attaching to the lens molding surface.

FIG. 25 is a sectional view of the main part of a gasket according to the 13th embodiment of the present invention. The 13th embodiment shows a case wherein a removal preventive portion 146 as that of the 12th embodiment shown in FIG. 24 is formed on a gasket 71 as that of the 10th embodiment shown in FIG. 20. A gasket main body 151A of a gasket 151 forms a cylinder. A positioning projecting ridge 151C which positions a first mold 137, and a removal preventive portion 151D which prevents the first mold 137 from coming out integrally project on the inner circumferential surface of the gasket main body 151A. That portion of the inner circumferential surface of the gasket main body 151A which is between the positioning projecting ridge 151C and removal preventive portion 151D comprises a small-diameter cylindrical portion 156 and a taper relief portion 157 which moderately increases in diameter upward.

The removal preventive portion 151D integrally projects on the inner circumferential surface of the gasket main body 151A throughout the entire circumference to form a ring-like shape. The removal preventive portion 151D has a triangular section and inclines downward. The distal end of the removal preventive portion 151D presses an upper surface 137a of the first mold 137 downward in the axial direction to prevent the mold 137 from coming out. In this case, while the distal end portion of the removal preventive portion 151D presses the upper surface 137a of the mold 137, no force acts in a direction to increase the diameter of the gasket main body 151A. Thus, the sealing performance of the small-diameter cylindrical portion 156 is maintained better. In this case as well, the holding force for the mold 3 can be improved in the same manner as in the 12th embodiment shown in FIG. 24. The removal preventive portion 151D can be formed intermittently on the inner circumferential surface of the gasket main body 151A. The removal preventive portions 146 and 151D as in the 12th and 13th embodiments shown in FIGS. 24 and 25 can be applied to the sixth to 11th embodiments.

The present invention is not limited to the first to 13th embodiments shown in FIGS. 1A to 25, but can be changed or modified in various manners. For example, although one bent portion is provided to the projecting band in the first, second, fourth, and fifth embodiments, a plurality of bent portions may be provided.

In the present invention, the lens molding surfaces of the molds 3 and 4 are axi-rotationally symmetric surfaces. However, the present invention is not limited to this. Even when the height of the circumferential edge of the lens molding surface changes in the circumferential direction, as in the case of an axi-rotationally asymmetric lens molding surface, if the height falls within the allowable range of the elastic deformation of the projecting band 5, 25, . . . , or the like, the sealing performance does not suffer. When the difference in height of the circumferential edge of the lens molding surface of the mold in the circumferential direction is large, the elastically deformable ranges for the size and angle of the projecting band can be set large. Also, the gasket can be formed to have such a shape that the height in the circumferential direction of the projecting band is changed in accordance with the height of the mold in the circumferential direction.

INDUSTRIAL APPLICABILITY

Although the present invention describes a gasket used for molding a meniscus lens, the present invention is not limited to this. For example, at least one surface of the optical surfaces of the lens can be a flat surface, and the present invention can also be applied to a gasket which is used to mold a lens having two convex or concave surfaces.

The invention claimed is:

1. A method for manufacturing a spectacle plastic lens, comprising the steps of
    forming a spectacle plastic lens molding mold by incorporating, in a gasket, a first mold with a lens molding surface that forms one lens surface of the spectacle plastic lens and a second mold with a lens molding surface that forms the other lens surface of the spectacle plastic lens to be spaced apart from each other at a predetermined gap, and
    filling a lens raw material into a cavity of the spectacle plastic lens molding mold, and curing the lens raw material, characterized in that the gasket includes a cylindrical gasket main body and an elastic projecting band which integrally projects on an inner circumferential wall of the gasket main body throughout an entire circumference, the projecting band includes a ring-like proximal end portion which projects from the inner circumferential wall of the gasket main body to extend in a direction substantially perpendicular to an axial direction of the gasket main body a tapered distal end portion which extends in a direction substantially parallel to the axial direction of the gasket main body, and a bent portion bend-connecting the proximal end portion and the distal end portion, the proximal end portion flexes more than the distal end portion around the bent portion as a border when pushed from the distal end portion side [M.Y1] downward along the axial direction of the gasket main body, the incorporating step comprises the steps of elastically deforming the gasket main body in the diameter-enlarging direction, holding at least one of the first mold and the second mold by pressing a circumferential surface of said one mold in a diameter-reducing direction with a restoring force of elastic deformation, and when holding said one mold, bringing a vertex of the distal end portion into linear contact with the lens forming surface of said one mold while the distal end portion undergoes a smaller flexure in a direction perpendicular to the axial direction of the gasket main body than a flexure undergone by the proximal end portion in the axial direction of the gasket main body.

2. A method for manufacturing a spectacle plastic lens, including the steps of forming a spectacle plastic lens molding mold by incorporating, in a gasket, a first mold with a lens molding surface that forms one lens surface of the spectacle plastic lens and a second mold with a lens molding surface that forms the other lens surface of the spectacle plastic lens to be spaced apart from each other at a predetermined gap, and filling a lens raw material into a cavity of the spectacle plastic lens molding mold, and curing the lens raw material, characterized in that the gasket includes a cylindrical gasket main body, in a portion where at least one of the first mold and the second mold is to be incorporated, an inner circumferential surface of the gasket main body has an inner diameter smaller than an outer diameter of said one mold, and a taper surface that spreads toward an opening side of the gasket main body, and the incorporating step comprises the steps of elastically deforming the gasket main body in the diameter-enlarging direction, holding said one mold by pressing a circumferential surface of said one mold in a diameter-reducing direction with a restoring force of elastic deformation, and in holding said one mold, causing the taper surface to come into strongest contact with a lens molding surface side circumferential edge of said one mold; and sealing portions in the vicinity of the lens molding surface side circumferential edge of said one mold onto the taper surface with a leakage monomer throughout the entire circumference thereof by stably gathering the leakage monomer in a gap formed between the taper surface and the lens molding surface side circumferential edge of said one mold.

3. A method for manufacturing a spectacle plastic lens, comprising the steps of forming a spectacle plastic lens molding mold by incorporating, in a gasket, a first mold with a lens molding surface that forms one lens surface of the spectacle plastic lens and a second mold with a lens molding surface that forms the other lens surface of the spectacle plastic lens to be spaced apart from each other at a predetermined gap, and filling a lens raw material into a cavity of the spectacle plastic lens molding mold, and curing the lens raw material, characterized in that the gasket includes a cylindrical gasket main body and an elastic projecting band which integrally projects on an inner circumferential wall of the gasket main body throughout an entire circumference, the projecting band includes a ring-like proximal end portion which projects from the inner circumferential wall of the gasket main body to extend in a direction substantially perpendicular to an axial direction of the gasket main body, a tapered distal end portion which extends to incline with respect to the axial direction of the gasket main body, and a bent portion bend-connecting the proximal end portion and the distal end portion, the proximal end portion flexes more than the distal end portion around the bent portion as a border when pushed from the distal end portion side [M.Y1] downward along the axial direction of the gasket main body, the incorporating step comprises the steps of elastically deforming the gasket main body in the diameter-enlarging direction, holding at least one of the first mold and the second mold by pressing a circumferential surface of said one mold in a diameter-reducing direction with a restoring force of elastic deformation, and when holding said one mold, bringing a vertex of the distal end portion into linear contact with the lens forming surface of said one mold while the distal end portion undergoes a smaller flexure in a direction perpendicular to the axial direction of the gasket main body than a flexure undergone by the proximal end portion in the axial direction of the gasket main body.

4. A method according to claim 2, characterized in that the taper surface inclines at an angle of approximately 0.5-15° with respect to an axis of said gasket main body.

* * * * *